US011801443B2

(12) United States Patent
Kim et al.

(10) Patent No.: US 11,801,443 B2
(45) Date of Patent: Oct. 31, 2023

(54) TARGET-BASED MOUSE SENSITIVITY RECOMMENDATIONS

(71) Applicant: NVIDIA CORPORATION, Santa Clara, CA (US)

(72) Inventors: Joohwan Kim, San Jose, CA (US); Benjamin Boudaoud, Efland, NC (US); Josef Bo Spjut, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 44 days.

(21) Appl. No.: 17/471,048

(22) Filed: Sep. 9, 2021

(65) Prior Publication Data
US 2022/0203230 A1 Jun. 30, 2022

Related U.S. Application Data

(60) Provisional application No. 63/130,579, filed on Dec. 24, 2020.

(51) Int. Cl.
*A63F 13/211* (2014.01)
*A63F 13/426* (2014.01)
*G06F 3/0354* (2013.01)
*A63F 13/837* (2014.01)

(52) U.S. Cl.
CPC .......... *A63F 13/426* (2014.09); *A63F 13/211* (2014.09); *A63F 13/837* (2014.09); *G06F 3/03543* (2013.01)

(58) Field of Classification Search
CPC .... A63F 13/211; A63F 13/426; A63F 13/837; G06F 3/03543
See application file for complete search history.

(56) References Cited

U.S. PATENT DOCUMENTS

| | | | | |
|---|---|---|---|---|
| 5,508,717 A * | 4/1996 | Miller | ................. | G06F 3/04842 345/157 |
| 6,392,675 B1 * | 5/2002 | Becker | ................ | G06F 3/04812 715/858 |
| 8,232,965 B2 * | 7/2012 | Bells | ....................... | G06F 3/038 345/169 |
| 11,287,909 B2 * | 3/2022 | Lu | ....................... | G02B 6/0001 |
| 11,385,728 B2 * | 7/2022 | Seibert | ................ | G06F 3/04812 |
| 2005/0176504 A1 * | 8/2005 | Stanley | ................... | A63F 13/42 463/37 |
| 2007/0188458 A1 * | 8/2007 | Bells | .................. | G06F 3/03549 345/167 |
| 2010/0081507 A1 * | 4/2010 | Finocchio | ............... | A63F 13/22 463/37 |
| 2012/0272170 A1 * | 10/2012 | Hammoud | ........... | G06F 3/0486 715/769 |
| 2013/0150164 A1 * | 6/2013 | Grever | ................... | A63F 13/24 463/37 |
| 2016/0109964 A1 * | 4/2016 | Wang | ...................... | G06F 3/038 345/166 |
| 2018/0024647 A1 * | 1/2018 | Coletrane-Pagan | .... | G06F 3/023 345/158 |
| 2019/0018539 A1 * | 1/2019 | Zhong | ................. | G06F 3/04166 |
| 2019/0354259 A1 * | 11/2019 | Park | ...................... | G06F 1/1694 |
| 2021/0373678 A1 * | 12/2021 | Chauvin | ............... | G06F 3/0346 |

OTHER PUBLICATIONS

Bohan et al., "Gain And Target Size Effects on Cursor-Positioning Time with A Mouse", In Proceedings of the Human Factors and Ergonomics Society Annual Meeting, vol. 47. 2003, SAGE Publications, pp. 737-740.

Casiez et al., "The Impact of Control-Display Gain on User Performance in Pointing Tasks", Human-computer interaction, vol. 23, No. 3, 2008, pp. 215-250.

Chen et al., "Structure of Hand/Mouse Movements", IEEE Transactions on Human-Machine Systems, vol. 45, No. 6, 2015, pp. 790-798.

Chua et al., "Visual Regulation of Manual Aiming", Human Movement Science vol. 12, No. 4, 1993, pp. 365-401.

Fitts, Paul M., "The Information Capacity of The Human Motor System in Controlling the Amplitude of Movement", Journal of experimental psychology, vol. 47, No. 6, 1954, pp. 381-391.

Fitts et al., "Information Capacity of Discrete Motor Responses", Journal of experimental psychology, vol. 67, No. 2, 1964, pp. 103-112.

Hourcade et al., "Pointassist for Older Adults: Analyzing Sub-Movement Characteristics to Aid in Pointing Tasks", In Proceedings of the SIGCHI Conference on Human Factors in Computing Systems (CHI '10). Association for Computing Machinery, URL: https://doi.org/10.1145/17533261753494, Apr. 10-15, 2010, pp. 1115-1124.

Hsieh et al., "Submovement Control Processes in Discrete Aiming as a Function of Space-Time Constraints", Plos one, URL: https://doi.org/10.1371/journal.pone.0189328, vol. 12, No. 12, Dec. 27, 2017, 14 pages.

Hwang et al., "Mouse Movements of Motion-Impaired Users: A Submovement Analysis", SIGACCESS Access. Computing, URL: https://doi.org/10.1145/1029014.1028649, Sep. 2003, pp. 102-109.

Jellinek et al., "Powermice and User Performance", In Proceedings of the SIGCHI Conference on Human Factors in Computing Systems (CHI '90), Association for Computing Machinery, URL: https://doi.org/101145/97243.97276, Apr. 1990, pp. 213-220.

Körding et al., "Bayesian Integration in Sensorimotor Learning", Nature, vol. 427, Jan. 15, 2004, pp. 244-247.

(Continued)

*Primary Examiner* — David L Lewis
*Assistant Examiner* — Shauna-Kay Hall
(74) *Attorney, Agent, or Firm* — Artegis Law Group, LLP

(57) ABSTRACT

One embodiment of a computer-implemented method for generating mouse sensitivity recommendations includes generating mouse movement data corresponding to one or more mouse movements performed by a user while interacting with a software application; generating a predicted efficiency for each mouse sensitivity level included in a plurality of mouse sensitivity levels based on the mouse movement data; and determining one or more mouse sensitivity levels to provide to the user based on the predicted efficiencies.

20 Claims, 9 Drawing Sheets

(56) References Cited

OTHER PUBLICATIONS

Lin et al., "Gain Effects on Performance Using A Head-Controlled Computer Input Device". Ergonomics Vo. 35, No. 2 1992, pp. 159-175.
Mackenzie, Scott I, "Fitts' Law as A Research and Design Tool in Human-Computer Interaction", Human-computer interaction, vol. 7, No. 1, pp. 1992, pp. 91-139.
Mackenzie et al,. "Extending Fitts' Law to Two-Dimensional Tasks", In Proceedings of the SIGCHI Conference on Human Factors in Computing Systems (CHI '92). Association for Computing Machinery, URL: https://doi.org/10.1145/142750.142794, May 3-7, 1992, pp. 219-226.
Meyer et al., "Optimality in Human Motor Performance: Ideal Control of Rapid Aimed Movements", Psychological review, vol. 95, No. 3, 1988, pp. 340-370.
Pang et al., "Effects of Gain and Index of Difficulty on Mouse Movement Time and Fitts' Law", IEEE Transactions on Human-Machine Systems Vo. 49, No. 6, 2019, 8 pages.
Sandfeld et al., "Effect of Computer Mouse Gain and Visual Demand on Mouse Clicking Performance and Muscle Activation in a Young and Elderly Group of Experienced Computer Users", Applied Ergonomics,vol. 36, No. 5, 2005, pp. 547-555.
Schuetz et al., "An Explanation of Fitts' Law-like Performance in Gaze-Based Selection Tasks Using a Psychophysics Approach", In Proceedings of the 2019 CHI Conference on Human Factors in Computing Systems (CHI '19), Association for Computing Machinery, URL: https://doi.org/10.1145/3290605.3300765, May 4-9, 2019, 13 pages.
Senanayake et al., "Pointing Device Performance in Steering Tasks", Perceptual and motor skills, vol. 122, No. 3 2016, 25 pages.
Spjut et al., "FirstPersonScience: Quantifying Psychophysics for First Person Shooter Tasks", In UCI Esports Conference, 2019, 7 pages.
Todorov et al., "Optimal Feedback Control as a Theory of Motor Coordination", Nature neuroscience vol. 5, No. 11 Nov. 2002, pp. 1226-1235.
Tränkle et al., "Factors Influencing Speed and Precision of Cursor Positioning Using a Mouse", Ergonomics, vol. 34, No. 2, 1991, pp. 161-174.
/u/StruthGaming, "Your aim isn't terrible, your mouse sensitivity is (PC)" Reddit, Retrieved from https://www.reddit.com/r/apexlegends/comments/apbo8z/your_aim_isnt_terrible_your_mouse_sensitivity_is/, 2019, 1 page.
Wobbrock et al., "Goal Crossing with Mice and Trackballs for People with Motor Impairments: Performance, Submovements, and Design Directions", ACM Transactions on Accessible Computing, URL: https://doi.org/10.1145/1361203.1361207, vol. 1, No. 1, Article 4, May 2008, 37 pages.

\* cited by examiner

TARGET-BASED MOUSE SENSITIVITY RECOMMENDATIONS

CROSS-REFERENCE TO RELATED APPLICATIONS

This application claims the priority benefit of U.S. provisional patent application titled, "TARGET-BASED MOUSE SENSITIVITY RECOMMENDATION," filed on Dec. 24, 2020, and having Ser. No. 63/130,579. The subject matter of this related application is hereby incorporated herein by reference.

BACKGROUND

Field of the Various Embodiments

Embodiments of the present disclosure relate generally to computer science and computer gaming technology and, more specifically, to target-based mouse sensitivity recommendations.

Description of the Related Art

Mouse sensitivity refers to the relationship between the physical motion of a hardware mouse and the virtual motion that the physical motion induces in a computer-based environment or within a software application. Virtual motion includes, for example and without limitation, translational motion (e.g., pointer-based tasks), rotational motion (e.g., view rotation), and categorical motion (e.g., directional selection). Mouse sensitivity is typically the product of different hardware and software factors, such as the sensor resolution of the hardware mouse, the gain factor of the operating system (e.g., operating system mouse speed settings), and the gain factor of the application (e.g., in-game sensitivity settings).

In the context of video games, mouse sensitivity is oftentimes a significant factor in player performance in the context of targeting-based tasks. For example, in video games with dynamic targets having various sizes and locations at different virtual distances, a given player must select the dynamic targets quickly and accurately in order to compete successfully against other players. A higher mouse sensitivity results in faster virtual motion compared to the virtual motion produced by a lower mouse sensitivity over the same time and displacement. However, the faster virtual motion also makes the dynamic target more difficult for the player to accurately select. In contrast, a slower virtual motion enables the player to select the dynamic target more accurately. Accordingly, a high mouse sensitivity results in the player reaching the dynamic target faster while having a lower accuracy, and a lower mouse sensitivity results in the player having a higher accuracy but reaching the dynamic target more slowly. Therefore, selecting a particular mouse sensitivity requires balancing accuracy with virtual motion speed.

The mouse sensitivity that is suitable for a given player depends on a number of factors, including the hardware and/or software configuration being used by the given player, the particular video game being played, the particular role or character being played, the gameplay characteristics of the given player, as well as the physical characteristics of the given player. As an example, when a player plays a first character within a video game, the player may need to make quick movements but have larger targets (i.e., does not need high accuracy). When the player plays a second character within the video game, the player may need high accuracy but does not need to make quick movements. Therefore, although the player is playing the same video game, the player could prefer different mouse sensitivities depending on the character being played. As another example, two players could have different arm range of motions and different arm movement speeds. If the two players use the same mouse sensitivity, even playing the same character and the same game, they would achieve different levels of accuracy. In practice, each of the two players would require a different mouse sensitivity.

Typically, to select a given mouse sensitivity, a player can either use the default mouse sensitivity implemented by the video game being played, use a mouse sensitivity recommended by another player, or choose a mouse sensitivity from a range of mouse sensitivities commonly used by a particular group of players. However, because the optimal mouse sensitivity varies so much from player to player, default mouse sensitivities, mouse sensitivities recommended by other players, and mouse sensitivities commonly used by other players are typically unsuitable for a given, individual player. Consequently, a given player usually has to make several adjustments to the initially selected mouse sensitivity and/or select many different mouse sensitivities in order to arrive at a suitable mouse sensitivity. Thus, with conventional approaches, significant trial-and-error usually is required before a given player is able to optimize the mouse sensitivity after selecting an initial mouse sensitivity.

As the foregoing illustrates, what is needed in the art are more effective ways to recommend mouse sensitivities to individual users.

SUMMARY

One embodiment of the present disclosure sets forth a computer-implemented method for generating mouse sensitivity recommendations. The method includes generating mouse movement data corresponding to one or more mouse movements performed by a user while interacting with a software application. The method further includes generating a predicted efficiency for each mouse sensitivity level included in a plurality of mouse sensitivity levels based on the mouse movement data. In addition, the method includes determining one or more mouse sensitivity levels to provide to the user based on the predicted efficiencies.

At least one technical advantage of the disclosed techniques relative to the prior art is that, with the disclosed techniques, characteristics of an individual player are used to generate mouse sensitivity recommendations for that individual player. In particular, by analyzing the virtual motions produced by mouse movements made by an individual player, a pointing efficiency for that individual player can be predicted. The pointing efficiency is then used to generate the mouse sensitivity recommendations for that individual player. Accordingly, the disclosed techniques produce recommended mouse sensitivities that are specific to the types of mouse movements made by the individual player, thereby providing the player with a suitable mouse sensitivity while avoiding the inefficient trial-and-error process oftentimes experienced with prior art approaches. Further, the disclosed techniques do not rely on mouse sensitivities used by other players when generating the mouse sensitivity recommendations for an individual player. Therefore, the disclosed techniques can be used to generate a mouse sensitivity recommendation for an individual player of a video game where mouse sensitivities used by other players and information about commonly-used mouse sensitivities are unavailable. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
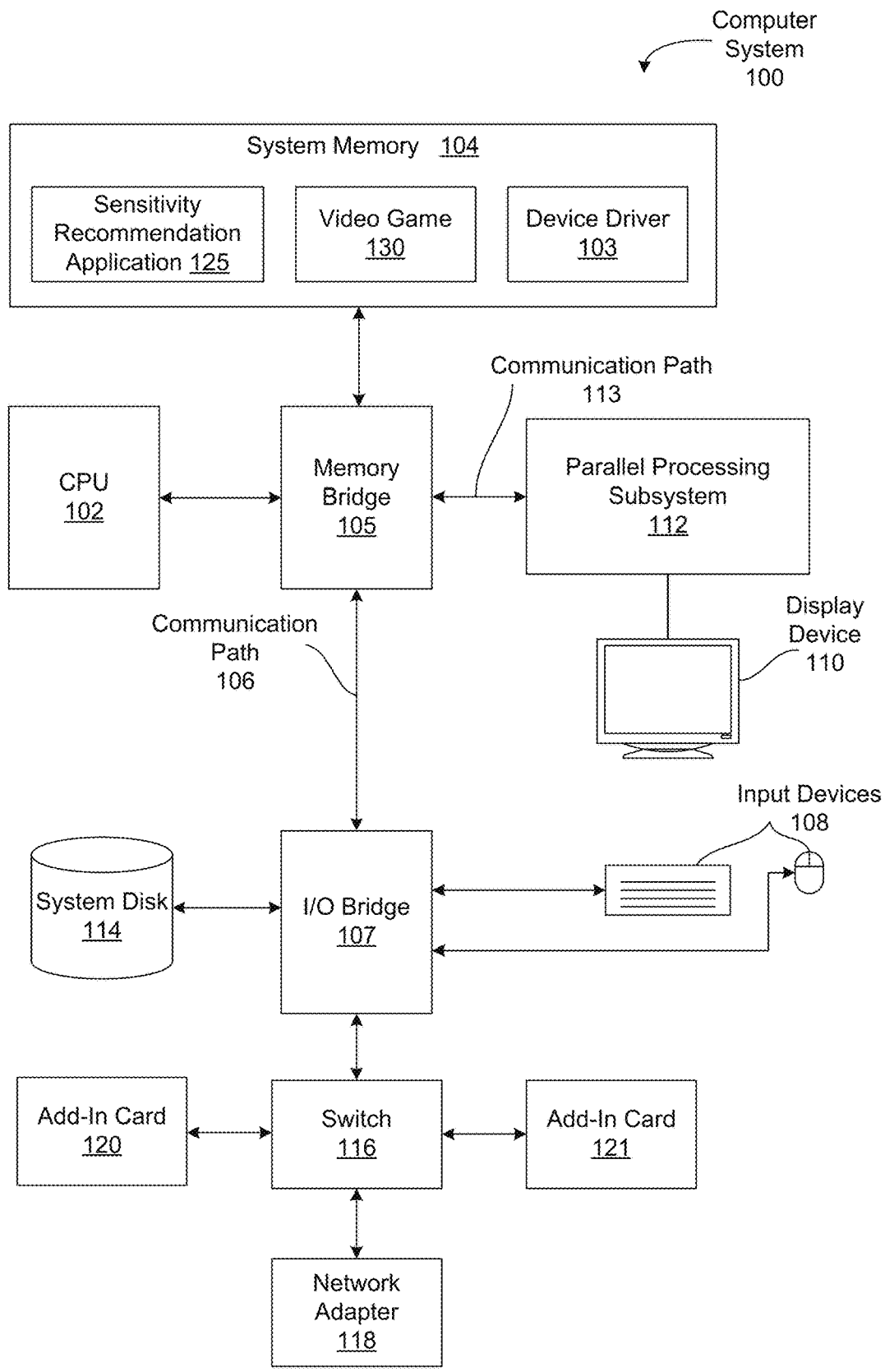
FIG. 1 is a block diagram illustrating a computer system configured to implement one or more aspects of the various embodiments.

FIG. 1 is a block diagram illustrating a computer system 100 configured to implement one or more aspects of the present invention, according to one embodiment. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point to point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations.

System memory 104 includes at least one device driver 103 configured to manage the processing operations of the one or more PPUs within parallel processing subsystem 112. The system memory 104 also includes a plurality of software applications that execute on the CPU 102, such as sensitivity recommendation application 125 and video game 130. As explained in further detail below, sensitivity recommendation application 125 analyzes mouse movements made by a user while playing the video game 130 and generates mouse sensitivity recommendations for the user.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In some embodiments, computer system 100 comprises a number of compute instances (not shown) that each include one or more of the elements of FIG. 1. The compute instances may be distributed across multiple geographic locations or implemented in one or more cloud computing environments (i.e., encapsulated shared resources, software, data, etc.) in any combination. Lastly, in certain embodiments, one or more components shown in FIG. 1 may not be present. For example, switch 116 could be eliminated, and network adapter 118 and add in cards 120, 121 would connect directly to I/O bridge 107.

Generating Mouse Sensitivity Recommendations

Figure 2:
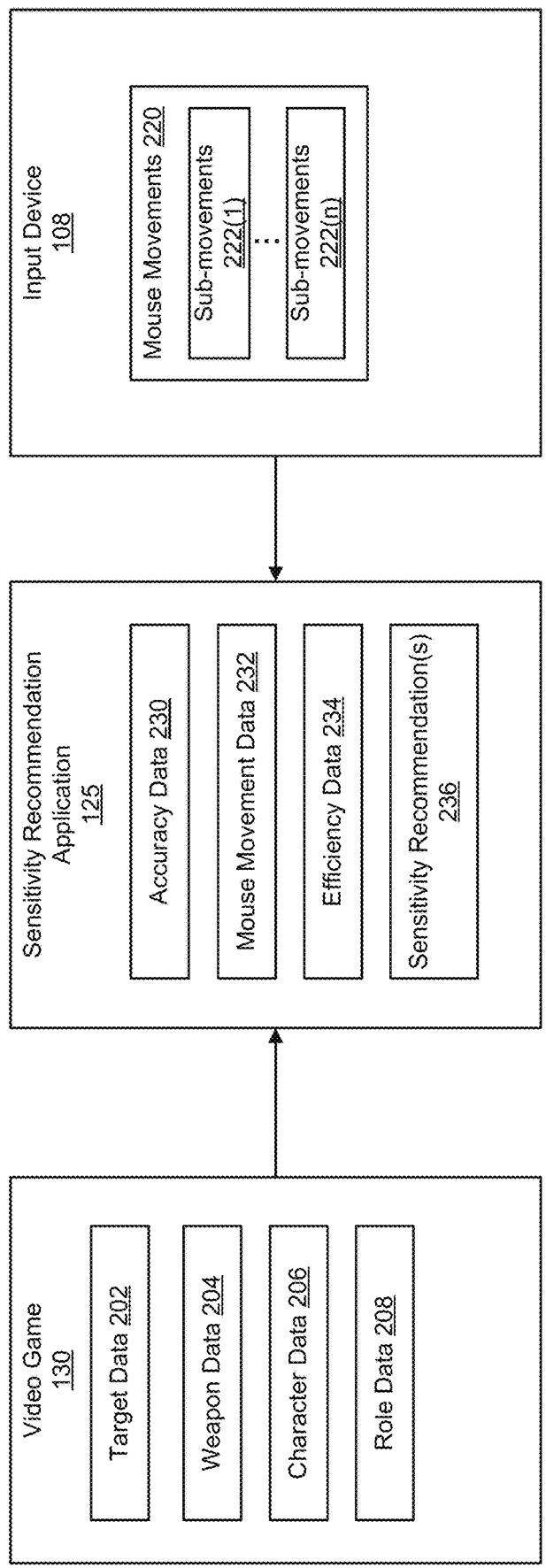
FIG. 2 is a more detailed illustration of the sensitivity recommendation application of FIG. 1, according to various embodiments.

FIG. 2 is a more detailed illustration of the sensitivity recommendation application 125 of FIG. 1, according to various embodiments of the present disclosure. As shown, sensitivity recommendation application 125 receives data from the video game 130 and one or more input devices 108 and generates one or more sensitivity recommendations 236.

Video game 130 is a computer-based electronic game. In some embodiments, video game 130 is a first-person shooter (FPS) game. In an FPS game, a game world is rendered on a display screen of the player from the perspective of a player character, i.e., from a first-person perspective.

A player interacts with the video game 130 using one or more input devices 108, such as a mouse and keyboard. In some embodiments, the user controls the movement of the player character using a keyboard and the rotation of the player character using a mouse. Video game 130 receives input corresponding to a mouse movement and translates the mouse movement into virtual motion of the player character within the game world space, such as rotating the player character a number of degrees based on the amount of mouse movement. The field of view and/or line of sight of the player character changes based on the movement and/or rotation of the player character. Accordingly, the view of the game world that is rendered on the display screen also changes based on the movement and/or rotation of the player character.

Figure 3:
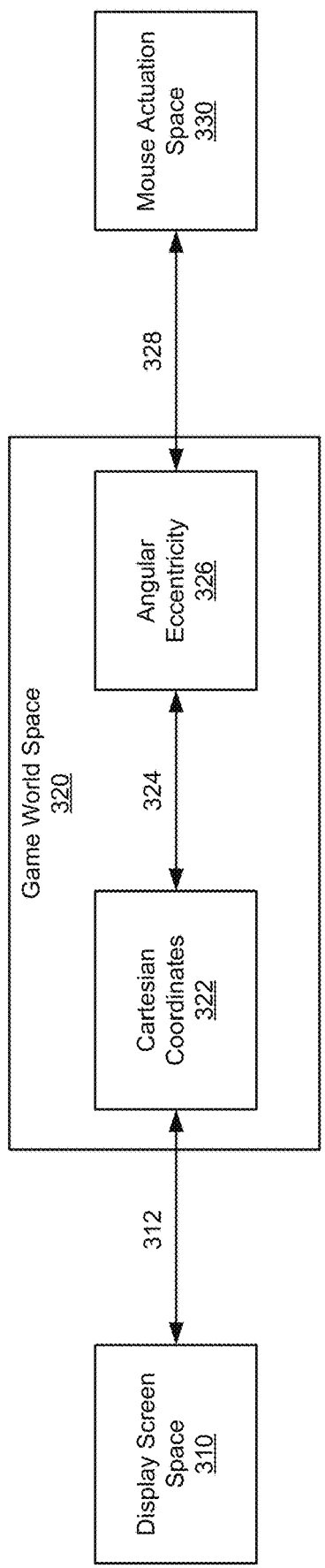
FIG. 3 is an illustration of the relationships between a display screen space, a game world space, and a mouse actuation space, according to various embodiments.

FIG. 3 is a block diagram illustrating relationships between positions in a display screen space 310, a game world space 320, and a mouse actuation space 330, according to various embodiments. The game world space 320 is a virtual, three-dimensional (Euclidean) space in which objects of the video game 130 and interactions between the objects of the video game 130 are simulated. For example, when a player moves a player character, the movement of the player character is within the game world space 320. As shown in FIG. 3, positions within the game world space 320 are defined using Cartesian coordinates 322.

The display screen space 310 is a two-dimensional space corresponding to the screen of a display device, such as display device 110. The display device 110 displays a two-dimensional view of the objects within the game world space. In the case of a FPS game, the display device 110 displays a two-dimensional view from the perspective of the player character.

To display video game 130 on a display device 110, object locations in game world space 320 are translated to locations within display screen space 310. As shown in FIG. 3, in-game objects are projected from game world space 320 onto display screen space 310 using perspective projection 312. Perspective projection 312 is a projective mapping that projects three-dimensional objects onto a two-dimensional plane based on a camera position, orientation, and field of view. In some embodiments, the camera position, orientation, and field of view when displaying video game 130 corresponds to the position, line of sight, and field of view of the player character. Perspective projection 312 may be performed using any suitable techniques that map coordinates from a three-dimensional space to coordinates within a two-dimensional space, such as panini projection, lens warp, single point projection, multi-point projection, and other functional or artistic projections. In some embodiments, perspective projection 312 is performed using a 4×4 projection matrix. An inverse transformation matrix could be used to convert from display screen space 310 back to game world space 320.

The mouse actuation space 330 is a physical two-dimensional space in which the player moves the mouse, such as a mousepad, desk, or other surface. Mouse movements made by the mouse within the mouse actuation space 330 are translated into movements within the game world space 320. For example, an amount of mouse movement can be translated into a number of degrees of rotation of the player character or view of the player character. Similarly, a number of degrees of rotation within the game world space 320 can be translated into a distance of mouse movement within mouse actuation space 330.

In some embodiments, during gameplay, video game 130 displays one or more targets to the player and the player attempts to select the one or more targets. Each target can be a different size and located at a different distance, within game world space 320, from the player character. Additionally, the size and/or distance of a target can change over time. For example, a target could be another character within video game 130, such as another player character or a computer-controlled character. The size, distance, and orientation of the other character relative to the player character changes as both the player character and as the other character move within game world space 320.

Selecting a target includes adjusting the line of sight of the player character until a reticle is aligned with the target (i.e., aiming at the target using mouse movements) and actuating a key or mouse button once the reticle is aligned with the target. The distance and size of a target within the game world space 320 can be translated into a target area within the mouse actuation space 330. The target area within the mouse actuation space 330 corresponds to the portion of mouse actuation space 330 in which the mouse should be located in order to align the reticle with the target within video game 130.

As shown in FIG. 3, the location of the target, with respect to the player character, is converted from Cartesian coordinates 322 to spherical coordinates using spherical projection 324 to generate an angular eccentricity 326. The angular eccentricity 326 represents the distance from the line of sight of the player character to the target as a number of degrees. In some embodiments, the line of sight of the character corresponds to a ray extending from the position of the player towards the direction the character is facing.

An angle-to-distance ratio 328 is used to convert the angular eccentricity 326 into a distance within mouse actuation space 330. The angle-to-distance ratio represents a ratio between a number of degrees of rotation within the game world space 320 and a mouse travel distance (e.g., number of millimeters) within mouse actuation space 330. In some embodiments, the angle-to-distance ratio corresponds to a sensitivity level of the mouse.

In some embodiments, the angle-to-distance ratio for a given video game 130 is calculated by determining or measuring a number of degrees of rotation that is performed in the game world space 320 when the mouse is moved a given distance in mouse actuation space 330. An example equation for computing an angle-to-distance ratio based on an amount of mouse movement is given by equation (1):

$$AD\_ratio = 360/turn\_distance \qquad (1)$$

In equation (1), AD_ratio represents a ratio between number of degrees and a number of millimeters (°/mm), and turn_distance represents the travel distance of the mouse, in millimeters, needed to rotate 360 degrees in game world space 320.

In some embodiments, the angle-to-distance ratio for a given video game 130 is calculated based on a conversion scale associated with the video game 130. In-game sensitivity setting values for a video game 130 can differ from the in-game sensitivity setting values for other video games 130. The conversion scale associated with a video game 130 is a value used to convert in-game sensitivity setting values of video game 130 into a common unit of measurement, such as degrees-per-millimeter (°/mm), i.e., the angle-to-distance ratio. An example equation for computing an angle-to-distance ratio based on a conversion scale associated with a video game and in-game sensitivity setting values associated with the video game is given by equation (2):

$$AD\_ratio = conversion\_scale \times game\_sensitivity \times DPI \times 1/25.4 \qquad (2)$$

In equation (2), conversion_scale represents the conversion scale associated with the video game, game_sensitivity represents the in-game sensitivity value selected for the video game, and DPI (dots per inch) represents the sensor resolution of the mouse. As discussed above, AD_ratio is expressed as degrees per millimeter. Because DPI is measured in inches, in equation (2), 1/25.4 is used to convert the unit of measurement from inches to millimeters. In various embodiments, additional scale factors, such as acceleration factors, could be included when converting between the angle-to-distance ratio and the video game sensitivity setting value. For example, the operating system or other applications executing on the computer system can be configured to modify the mouse movement speed and/or acceleration.

The distance to the target, in mouse actuation space 330, is calculated based on the angular eccentricity 326 and the angle-to-distance ratio 328. An example equation for computing a distance based on angular eccentricity and an angle-to-distance ratio is given by equation (3):

$$distance = eccentricity/AD\_ratio \qquad (3)$$

Similarly, for a given mouse sensitivity, distances in mouse actuation space 330 can be converted to distances in game world space 320 by computing angular eccentricities 326 corresponding to the distances. An example equation for computing an angular eccentricity based on a distance and an angle-to-distance ratio is given by equation (4):

$$eccentricity = distance \times AD\_ratio \qquad (4)$$

As shown in equations (3) and (4), the amount of rotation in game world space 320 that corresponds to the travel distance of a mouse movement depends on the angle-to-distance ratio, i.e., the sensitivity of the mouse. However, as shown in equation (2), mouse sensitivity changes based on the in-game sensitivity setting(s) applied to video game 130, the conversion scale associated with the video game 130, as well as the DPI settings of the mouse. Therefore, different in-game sensitivity setting(s) are used for different video games 130 in order to obtain the same mouse sensitivity.

Furthermore, as discussed above, the mouse sensitivity that is suitable for a given player differs based on a variety of different factors, such as the hardware and/or software configuration being used by the given player, characteristics of the particular video game being played, characteristics of the particular role or character being played, characteristics of the play style of the given player, as well as physical characteristics of the given player such as the kinematics associated with arm movements of the given player while operating a mouse.

To address these issues, sensitivity recommendation application 125 analyzes data associated with a video game and identifies recommended mouse sensitivities for the player based on the analysis. As discussed in further detail below, the recommended mouse sensitivities correspond to mouse sensitivity levels that maximize the speed and accuracy of the mouse movements performed by the player.

Returning to FIG. 2, sensitivity recommendation application 125 receives and/or generates data associated with video game 130 and/or data associated with mouse movements 220. The data associated with video game 130 includes any type of data that can be used to determine target distances and target sizes for targets included in video game 130. As shown in FIG. 2, the data associated with video game 130 includes target data 202, weapon data 204, character data 206, and role data 208.

Target data 202 includes data associated with targets within video game 130, such as sizes of targets, positions of targets, distances of targets from a player character, average sizes of targets within the video game 130, a range of sizes of targets within the video game 130, average distances of targets within the video game 130, a range of distances of targets within the video game 130, distributions of target sizes compared to target distances, frequencies of different target sizes and/or distances, probabilities of different target sizes and/or distances, and the like.

Weapon data 204 includes data associated with weapons within video game 130, such as weapon ranges of weapons within the video game 130, damage fall off of the weapons, bullet or projectile spread of the weapons, projectile trajectories of the weapons, weapon or projectile hit box sizes, and the like.

Character data 206 includes data associated with characters within video game 130. The characters could include one or more characters in video game 130 corresponding to player character options that can be selected by the player. Character data 206 could include, for example, character sizes for each character, movement speeds for each character, one or more weapons used by each character, and the like.

Role data 208 includes data associated with player roles within video game 130. A player role characterizes the style of gameplay of the player, the types of weapons used by the player, and/or the types of characters used by the player. For example, players playing a defensive role could be positioned closer to targets and attack from a close-range position, compared to players playing an offensive role and attack from a mid-range or long-range position. Similarly, different weapons and/or characters could be assigned to and/or more frequently chosen for different player roles. Role data 208 could include or identify, for example, one or more portions for target data 202, one or more portions weapon data 204, and/or one or more portions of character data 206 that correspond to each player role.

The mouse movement data 232 associated with mouse movements 220 includes any type of data that can be used to determine mouse movements made by a player, such as mouse positions, velocities associated with the mouse positions, timestamps associated with the mouse positions, DPI setting(s) of the mouse when making the mouse movements, the sensitivity level (in-game or general) of the mouse when making the mouse movements, and the like. In some embodiments, sensitivity recommendation application 125 tracks and/or records mouse movements made by the player and generates the mouse movement data 232. In some embodiments, sensitivity recommendation application 125 receives the mouse movement data 232 from video game 130 or from a separate application that captures mouse movements and generates mouse movement data 232.

When moving a mouse, a player could use several small movements to position the mouse within the mouse actuation space 330, rather than single long movements. For example, the range of motion and length of the arm of the player could limit the speed and distance that the player can move the mouse in a single arm movement. The player may need to lift and/or re-position the mouse to continue a mouse movement towards a target location in mouse actuation space 330. Accordingly, the trajectory of the mouse from a starting position to an ending position could be segmented into a plurality of sub-movements. As shown in FIG. 2, a mouse movement 220 includes one or more mouse sub-movements 222(1)-222(N).

In some embodiments, sensitivity recommendation application 125 processes mouse movement data 232 to segment mouse movements 220 into a plurality of sub-movements 222, Sensitivity recommendation application 125 determines, start times and end times corresponding to different sub-movements 222 based on velocities (e.g., degrees per millisecond) associated with different time stamps. In some embodiments, sensitivity recommendation application 125 determines a start time of a sub-movement by comparing the velocity at a given timestamp with a start velocity threshold. If sensitivity recommendation application 125 has not identified a new sub-movement, then sensitivity recommendation application 125 compares the velocity at the current timestamp with the start velocity threshold. If the velocity at the current timestamp is higher than the start velocity threshold, then sensitivity recommendation application 125 identifies the current timestamp as the start time of a sub-movement.

In some embodiments, sensitivity recommendation application 125 determines an end time of a sub-movement by comparing the velocity at subsequent timestamps with an end velocity threshold. If sensitivity recommendation application 125 determined a start time corresponding to a current sub-movement and has not identified an end time corresponding to the current sub-movement, then sensitivity recommendation application 125 compares the velocity at the current timestamp with the end velocity threshold. If the velocity at the current timestamp is below the end velocity threshold, then sensitivity recommendation application 125 identifies the current timestamp as the end time of the current sub-movement. Additionally, in some embodiments, to determine an end time of a sub-movement, sensitivity recommendation application 125 compares the time interval between the current timestamp and the start time of the sub-movement with a duration threshold. The duration threshold indicates a minimum duration of a sub-movement. If the velocity at the current timestamp is less than the end velocity threshold but the time interval is less than the duration threshold, then the current timestamp is not identified as the end time of the sub-movement. An example algorithm for parsing mouse movement data to identify a set of mouse sub-movement start and end times is given by Algorithm 1.

---

Algorithm 1

Data: time, azimuth (az), elevation (el) series
Result: list of submovement start and end times ($move_{start}$, $move_{end}$)
$az_{filt}$, $el_{filt}$ = $filter_{LP}$(time, az, el)
v = |δ($az_{filt}$), δ($el_{filt}$)|/δ(time)
for t in time do
   if previously in a submovement then
      if v[t] < $V_{end}$ and t − $t_{start}$ > $T_{min}$ then $move_{end}$, add(t)
   else if v[t] > $V_{start}$ then
      $move_{start}$, add(t); $t_{start}$ = t;
end

---

In Algorithm 1, sensitivity recommendation application 125 receives a series of data that includes a plurality of timestamps, and an azimuth and elevation corresponding to each timestamp. A low pass filter is applied to smooth the azimuth and elevation data prior to generating the sub-movement data. A velocity, v, is computed for each timestamp based on the azimuth and elevation corresponding to the timestamp. Subsequently, for each timestamp in the series, sensitivity recommendation application 125 determines whether a sub-movement was previously identified.

If a sub-movement is current identified, then sensitivity recommendation application 125 determines whether the velocity v[t] is less than an end velocity threshold $V_{end}$ and whether the time since the start of the sub-movement, $t_{start}$, is greater than the duration threshold $T_{min}$. If the velocity is less than the end velocity threshold and the time since the start of the sub-movement is greater than the duration threshold, then sensitivity recommendation application 125 determines that the current time corresponds to the end of the sub-movement and adds the current timestamp t as the end timestamp of the sub-movement.

If a sub-movement is not currently identified, then sensitivity recommendation application 125 determines whether the velocity v[t] is greater than a start velocity threshold $V_{start}$. If the velocity is greater than the start velocity threshold, then sensitivity recommendation application 125 determines that the current time corresponds to the start of a sub-movement and adds the current timestamp t as the start timestamp of a new sub-movement.

As shown in Algorithm 1, sensitivity recommendation application 125 generates a first set of timestamps corresponding to start times of different sub-movements and a second set of timestamps corresponding to end times of the different sub-movements.

In some embodiments, sensitivity recommendation application 125 receives or generates accuracy data 230 indicating accuracy values and/or error values associated with the mouse movements made by the player. The accuracy data 230 indicates, for a mouse movement or a mouse sub-movement, whether the movement or the sub-movement resulted in the player selecting a target. In some embodiments, the accuracy data 230 indicates, for a mouse movement or a mouse sub-movement, an amount of error associated with the movement or the sub-movement. For example, the accuracy data 230 could indicate the distance between the location(s) of the movement or the sub-movement and the location of a target.

In some embodiments, the mouse movement data 232 and accuracy data 230 are based on mouse movements 222 made by the player while playing video game 130. For example, sensitivity recommendation application 125 could analyze gameplay of video game 130 to determine mouse movements made by the player during the gameplay and whether the mouse movement resulted in the player successfully selecting a target. Sensitivity recommendation application 125 generates mouse movement data 232 and accuracy data 230 based on the analysis. In some embodiments, sensitivity recommendation application 125 integrates with video game 130 and/or monitors video game 130 and generates mouse movement data 232 and target accuracy data 230 while the player is playing video game 130. In some embodiments, sensitivity recommendation application 125 receives mouse movement data, input data, and game data indicating game events and object positions (e.g., game logs, recorded videos, rendered images), and correlates the mouse movement and input data with the game data to determine whether a mouse movement resulted in the player successfully selecting a target.

In some embodiments, the mouse movement data 232 and accuracy data 230 are based on mouse movements 222 made by the player in sensitivity recommendation application 125 or other application that simulates video game targets. For example, sensitivity recommendation application 125 could include a graphical user interface that presents different targets of sizes and distances similar to that of video game 130 to the player. The player moves the mouse and attempts to select the different targets. Sensitivity recommendation application 125 could generate mouse movement data 232 indicating the mouse movements 222 made by the player when aiming at the different targets displayed in the graphical user interface, as well as target accuracy data 230 indicating whether each mouse movement 222 resulted in the player successfully selecting a target.

In some embodiments, sensitivity recommendation application 125 collects and/or generates mouse movement data 232 and accuracy data 230 until a threshold amount of data has been collected and/or generated. For example, sensitivity recommendation application 125 could collect and/or generate mouse movement data 232 and accuracy data 230 until a threshold number of mouse sub-movements have been generated.

In some embodiments, sensitivity recommendation application 125 analyzes the mouse movement data 232 and accuracy data 230 to generate efficiency data 234. Efficiency data 234 includes data indicating predicted efficiencies associated with different mouse sensitivity levels. The efficiency associated with a mouse sensitivity level indicates an amount of time taken for a user to select a target at the mouse sensitivity level and/or an amount of accuracy of selecting a target at the mouse sensitivity level. In some embodiments, efficiency data 234 includes distance-speed relationship data and speed-error relationship data. The distance-speed relationship data indicates how the distance to a target relates to the maximum speed of motion towards the target. The speed-error relationship data indicates how the speed of a mouse movement or sub-movement impacts the error resulting from the mouse movement or sub-movement. In some embodiments, the distance-speed relationship and the speed-error relationship are each represented by one or more functions. Efficiency data 234 could include data indicating the one or more functions.

In some embodiments, sensitivity recommendation application 125 generates efficiency data 234 associated with a given player based on the mouse movement data 232 and accuracy data 230 generated from mouse movements made by the given player. In some embodiments, sensitivity recommendation application 125 also stores or receives generalized or model efficiency data 234. The generalized or model efficiency data 234 is generated based on mouse movement data and accuracy data for a plurality of players and/or a plurality of video games 130. Accordingly, the generalized or model efficiency data 234 associated with a mouse sensitivity level indicates an average amount of time taken for players in the plurality of players to accurately select a target at the mouse sensitivity level.

In some embodiments, to generate efficiency data 234, sensitivity recommendation application 125 determines, at the beginning of each mouse movement or mouse sub-movement, a distance to the target from the view direction. Sensitivity recommendation application 125 converts the distance to the target from a distance in game world space 320 to a distance in mouse actuation space 330. Calculating a distance in terms of mouse actuation space 330 based on a distance in game world space 320 is performed in a manner similar to that discussed above with respect to equations (1) through (3). At the end of the mouse movement or mouse sub-movement, sensitivity recommendation application 125 calculates a speed of the mouse movement or mouse sub-movement. In some embodiments, the speed of the mouse movement or mouse sub-movement is the average speed across the duration of the mouse movement or mouse sub-movement. The average speed could be calculated by determining the distance that the mouse traveled, in terms of mouse actuation space 330, and dividing the distance by the duration of the mouse movement or mouse sub-movement. For example, the average speed could be a number of millimeters per second. In some embodiments, sensitivity recommendation application 125 also calculates an error value associated with the mouse movement or mouse sub-movement. In some embodiments, the error value is a binary value that indicates whether, at the end of the mouse movement or mouse sub-movement, the distance to the target is less than the width of the target (i.e., the target was reached at the end of the mouse movement or sub-movement). In some embodiments, the error value is the distance to the target at the end of the mouse movement or sub-movement.

Sensitivity recommendation application 125 fits curves to the distance-speed relationship and the speed-error relationship to the mouse movement data 232 and accuracy data 230. In some embodiments, fitting curves to the distance-speed relationship includes generating a plurality of distance-speed data points corresponding to a plurality of mouse movements or mouse sub-movements, where each distance-speed data point indicates the distance to the target at the beginning of the mouse movement or sub-movement compared to the average speed associated with the mouse movement or sub-movement. One or more curves or functions are generated based on the plurality of distance-speed data points. In some embodiments, if the plurality of distance-speed data points do not cover an entire range of distance values, sensitivity recommendation application 125 could extrapolate the curves or functions to extend the one or more curves or functions across the entire range of distance values. Sensitivity recommendation application 125 uses the one or more curves or functions to predict, when a target is a given distance (in mouse actuation space 330) from the mouse, a speed that the player is likely to use to move the mouse towards the target. Accordingly, sensitivity recommendation application 125 can use the distance-speed relationship to predict, for a given distance, the movement time needed to reach the target.

In some embodiments, fitting curves to the speed-error relationship includes generating a plurality of speed-error data points corresponding to the plurality of mouse movements or mouse sub-movements, where each speed-error data points indicates the average speed associated with the mouse movement or sub-movement compared to the amount of error associated with the mouse movement or sub-movement. One or more curves or functions are generated based on the plurality of speed-error data points. In some embodiments, if the plurality of speed-error data points do not cover an entire range of speed values, sensitivity recommendation application 125 could extrapolate the curves or functions to extend the one or more curves or functions across the entire range of speed values. Sensitivity recommendation application 125 uses the one or more curves or functions to predict, when the player moves the mouse at a given speed, the amount of error that the player is likely to experience.

In various embodiments, any technically feasible curve fitting technique may be used to fit curves or functions to the plurality of distance-speed data points and the plurality of speed-error data points. The shape of the curves and/or the corresponding functions may differ for each player due to differences in the characteristics of each player, the hardware and software configurations of each player, and other factors discussed above that affect mouse sensitivity selection. Accordingly, the distance-speed relationship and the speed-error relationship for an individual player reflect these various factors.

Sensitivity recommendation application 125 receives and/or generates data associated with video game 130 and the mouse movements 220, such as one or more of target data 202, weapon data 204, character data 206, role data 208, accuracy data 230, mouse movement data 232, and efficiency data 234, and analyzes the data to generate one or more mouse sensitivity recommendations 236. The one or more mouse sensitivity recommendations 236 indicate one or more recommended mouse sensitivity levels and/or one or more ranges of recommended mouse sensitivity levels. In some embodiments, sensitivity recommendation application 125 the one or more recommended mouse sensitivity levels and/or one or more ranges of recommended mouse sensitivity levels using a common unit of measurement, such as degrees-per-millimeter (°/mm). Additionally, sensitivity recommendation application 125 could calculate, based on a conversion scale associated with a video game 130, one or more in-game sensitivity setting values and/or one or more ranges of in-game sensitivity setting values for the video game 130. For example, referring to equation (2), sensitivity recommendation application 125 could determine a recommended number of degrees-per-millimeter and calculate a recommended in-game sensitivity setting value for a video game 130 based on the conversion scale associated with the video game 130.

In some embodiments, the one or more mouse sensitivity recommendations 336 include one or more of a game-specific sensitivity recommendation, a role-specific sensitivity recommendation, a character-specific sensitivity recommendation, a player-specific sensitivity recommendation, a role-specific and player-specific sensitivity recommendation, or a character-specific and player-specific sensitivity recommendation.

A game-specific sensitivity recommendation is a recommended mouse sensitivity for video game 130 that is not specific to any individual player. In some embodiments, generating a game-specific sensitivity recommendation is based on the sizes and distances of a plurality of targets included in the video game 130. Sensitivity recommendation application 125 determines target data 202 for video game 130 and determines, based on the target data 202, the sizes and distances associated with the plurality of targets. The sizes and distances associated with the plurality of targets could be, for example, an average size and an average distance of the plurality of targets; a range of sizes and a range of distances of the plurality of targets; or probabilities associated with a plurality of sizes for the plurality of targets and a plurality of distances for the plurality of targets.

In some embodiments, sensitivity recommendation application 125 generates one or more game-specific sensitivity recommendations based on one or more stored or pre-defined mappings (not shown) that correlate sizes and/or distances of targets with different sensitivity values. Sensitivity recommendation application 125 determines, based on the mappings, one or more sensitivity values that correspond to the sizes and distances associated with the plurality of targets. For example, a mapping may indicate, for each distance value, in mouse actuation space 330, a different mouse sensitivity level corresponding to the distance value.

In some embodiments, sensitivity recommendation application 125 generates one or more game-specific sensitivity recommendations based on generalized or model efficiency data 234. The generalized or model efficiency data 234 includes generalized speed-error relationship data and generalized distance-speed relationship data. Sensitivity recommendation application 125 determines, based on the generalized distance-speed relationship data and the generalized speed-error relationship data, predicted task completion times and error values when using different mouse sensitivity levels. Sensitivity recommendation application 125 generates one or more mouse sensitivity levels based on the predicted task completion times and error values.

For example, for each mouse sensitivity, sensitivity recommendation application 125 determines one or more distances or ranges of distances associated with the plurality of targets based on the mouse sensitivity, the sizes of the plurality of targets, and the distances of the plurality of targets. Sensitivity recommendation application 125 determines one or more speeds or ranges of speeds corresponding to the one or more distances or ranges of distances based on the distance-speed relationship. Sensitivity recommendation application 125 determines one or more error values or ranges of error values corresponding to the one or more speeds or ranges of speeds, based on the speed-error relationship. Additionally, sensitivity recommendation application 125 could identify, based on the speed-error relationship and the distance-speed relationship, a range of distances and/or a range of speeds that should be avoided. Sensitivity recommendation application 125 could filter one or more mouse sensitivities based on the range of distances and/or the range of speeds. For example, sensitivity recommendation application 125 could filter distances and/or error values that correspond to movement times that are above a threshold value. As another example, sensitivity recommendation application 125 could filter distances where the distance-speed relationship is not a linear relationships and/or where the slope is lower than a threshold value and/or filter error values where the speed-error relationship is not a linear relationship, where the slope is higher than a first threshold amount, and/or where the slope lower than a second threshold amount.

Sensitivity recommendation application 125 identifies one or more mouse sensitivities associated with the highest task completion time(s) and/or lowest error(s). The particular balance between speed and error may vary depending on factors such as the configuration of sensitivity recommendation application 125, player preferences, whether the video game 130 rewards higher speeds and/or lower accuracies, and so forth.

A player-specific sensitivity recommendation is a recommended mouse sensitivity for video game 130 that is specific to the individual player. In some embodiments, sensitivity recommendation application 125 generates one or more player-specific sensitivity recommendations based on efficiency data 234 associated with the individual player. The efficiency data 234 includes distance-speed relationship data and speed-error relationship data. Sensitivity recommendation application 125 determines, based on the distance-speed data and the speed-error data, predicted task completion times and error values for the player when using different mouse sensitivity levels. Sensitivity recommendation application 125 determines one or more mouse sensitivity levels based on the predicted task completion times and error values, similar to generating game-specific sensitivity recommendations discussed above.

A character-specific sensitivity recommendation is a recommended mouse sensitivity for video game 130 that is specific to a given character in the video game 130. Sensitivity recommendation application 125 determines, based on target data 202 and character data 206, sizes and distances of targets associated with a given character. For example, if a character attacks from a longer range, then the character would be associated with targets that are smaller and further away compared to a character that attacks from close range. Sensitivity recommendation application 125 could determine, based on the weapon range and other characteristics of a given character, a subset of target data 202 that corresponds to the given character, such as a subset of sizes of the plurality of targets and a subset of distances to the plurality of targets. Sensitivity recommendation application 125 uses the subset of target data 202 rather than the full set of target data 202 when generating the game-specific and/or player-specific sensitivity recommendations, e.g., when computing target distances in mouse actuation space 330 for different mouse sensitivities. Using character-specific target data when generating a game-specific sensitivity recommendation identifies recommended mouse sensitivities that are specific to the given character, but not specific to any individual player. Using character-specific target data when generating a player-specific sensitivity recommendation identifies recommended mouse sensitivities that are specific to the given character when played by the individual player.

A role-specific sensitivity recommendation is a recommended mouse sensitivity for video game 130 that is specific to a given player role in the video game 130. Sensitivity recommendation application 125 determines, based on target data 202 and role data 208, sizes and distances of targets associated with a given role. For example, if player role typically involves attacking targets at close range, then the player role would be associated with targets that are closer and, therefore, larger compared to a player role that involves attacking targets from further away. Sensitivity recommendation application 125 could determine a subset of target data 202 that corresponds to the given player role based on characteristics of the player role such as weapons or weapon types associated with the player role, characters associated with the player role, player positioning or other playstyle information associated with the player role, and so forth. Sensitivity recommendation application 125 uses the subset of target data 202 rather than the full set of target data 202 when generating the game-specific and/or player-specific sensitivity recommendations, e.g., when computing target distances in mouse actuation space 330 for different mouse sensitivities. Using role-specific target data when generating a game-specific sensitivity recommendation identifies recommended mouse sensitivities that are specific to the given player role, but not specific to any individual player. Using role-specific target data when generating a player-specific sensitivity recommendation identifies recommended mouse sensitivities that are specific to the given player role when taken on by the individual player.

In some embodiments, after generating the one or more mouse sensitivity recommendations 336, the sensitivity recommendation application 125 displays the one or more mouse sensitivity recommendations 336 to the player. For example, sensitivity recommendation application 125 could display a recommended mouse sensitivity in degrees-per-millimeter or convert the recommended mouse sensitivity to an in-game sensitivity setting value and display the in-game sensitivity setting value. As another example, sensitivity recommendation application 125 could display one or more ranges of recommended mouse sensitivities in degrees-per-millimeter or one or more ranges of in-game sensitivity setting values. The player could set the in-game sensitivity setting value based on the recommendations 336 displayed by the sensitivity recommendation application 125.

In some embodiments, the sensitivity recommendation application 125 automatically applies a recommended in-game sensitivity setting value to the video game 130. For example, if the sensitivity recommendation application 125 identified a single mouse sensitivity level, then the sensitivity recommendation application 125 could interface with the video game 130 to set or modify the in-game sensitivity setting value based on the recommended mouse sensitivity level. As another example, if the sensitivity recommendation application 125 identified a plurality of recommended mouse sensitivity levels, then the sensitivity recommendation application 125 could display the plurality of recommended mouse sensitivity levels (e.g., selectable options or a slider) and set or modify the in-game sensitivity setting value based on user input selecting a specific recommended mouse sensitivity level.

In some embodiments, the sensitivity recommendation application 125 generates other types of recommendations, displays other types of information to the player, and/or performs other types of analysis based on the mouse movement data 232, the accuracy data 230, and/or the efficiency data 234. In some embodiments, sensitivity recommendation application 125 transmits the mouse movement data 232, the accuracy data 230, and/or the efficiency data 234 to another application for further processing. As an example, sensitivity recommendation application 125 or another application could display information to the player indicating mouse movement and/or sub-movement habits, suggest mouse path optimizations, identify targeting tasks or types of targeting tasks where the player performs poorly compared to other players, and the like. As another example, sensitivity recommendation application 125 or another application could detect cheating or bot-controlled players by analyzing the mouse movements and/or sub-movements performed by the player to determine whether the mouse movements, mouse sub-movements, accuracy data, and/or efficiency data are abnormal compared to the mouse movements, mouse sub-movements, accuracy data, and/or efficiency data of other players.

Although embodiments are described herein with reference to video games, sensitivity recommendation application 125 may be used to generate recommended mouse sensitivities for any type of software program or application, such as other software programs or applications that include selectable graphical user interface elements. Additionally, although embodiments are described herein with reference to dynamic targets, sensitivity recommendation application 125 may be used to generate recommended mouse sensitivities for video games and/or other software applications with selectable graphical user interface elements that do not change sizes and/or do not change locations.

Exemplar Target-Based Mouse Sensitivity Recommendations

Figure 4:
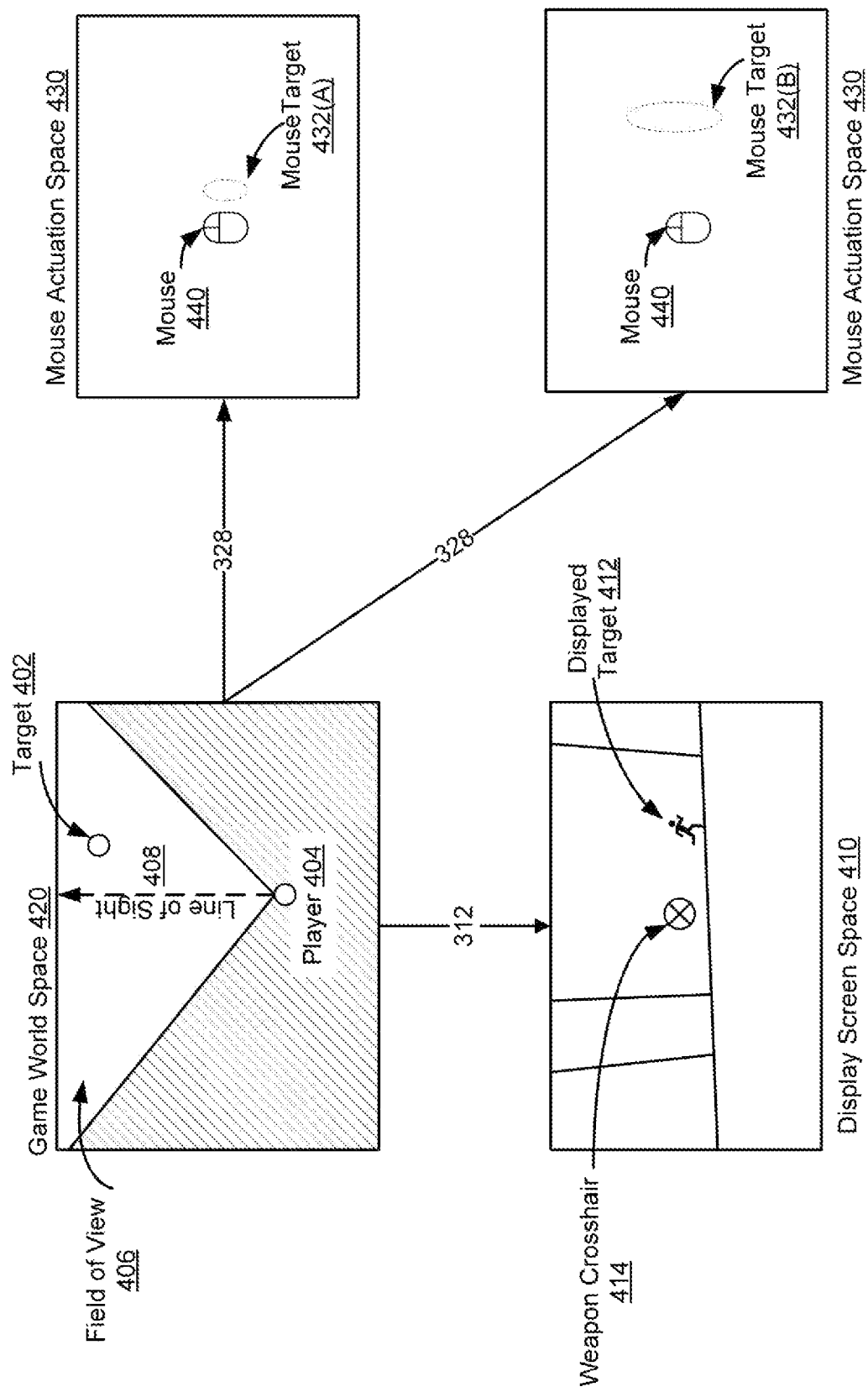
FIG. 4 illustrates exemplar target sizes and positions across a game world space, a display screen space, and mouse actuation space, according to various embodiments.

FIG. 4 illustrates exemplar target sizes and positions of a target 402 across a game world space 420, a display screen space 410, and mouse actuation space 430, according to various embodiments. As shown in FIG. 4, a player 404 and a target 402 are positioned at different locations within the game world space 420. Within game world space 420, player 404 has a line of sight 408 and a field of view 406. The target 402 is located far away from player 404 and is slightly to the right of the line of sight 408 of player 404.

The game world space 420 is projected onto display screen space 410 based on the field of view 406 of the player 404. In display screen space 410, a weapon crosshair 414 corresponds to the center of the line of sight 408 of the player 404. Because target 402 is far away from the player 404, the displayed target 412 appears as a small figure to the right of the weapon crosshair 414.

To aim at target 402, the player would need to rotate the field of view 406 to align the line of sight 408 with the target 402. Within display screen space 410, the player would need to rotate the view so that weapon crosshair 414 is positioned on top of or overlaps the displayed target 412. As discussed above, the size of the target in a mouse actuation space 430 and, therefore, the distance that a mouse 440 would have to move in order to align the line of sight 408 with the target 402, depends on the mouse sensitivity. As shown in FIG. 4, a high mouse sensitivity results in a mouse target 632(A) that is very small but close to the position of mouse 440, while a lower mouse sensitivity results in a mouse target 432(B) that is larger but further away from the position of mouse 440.

Figure 5:
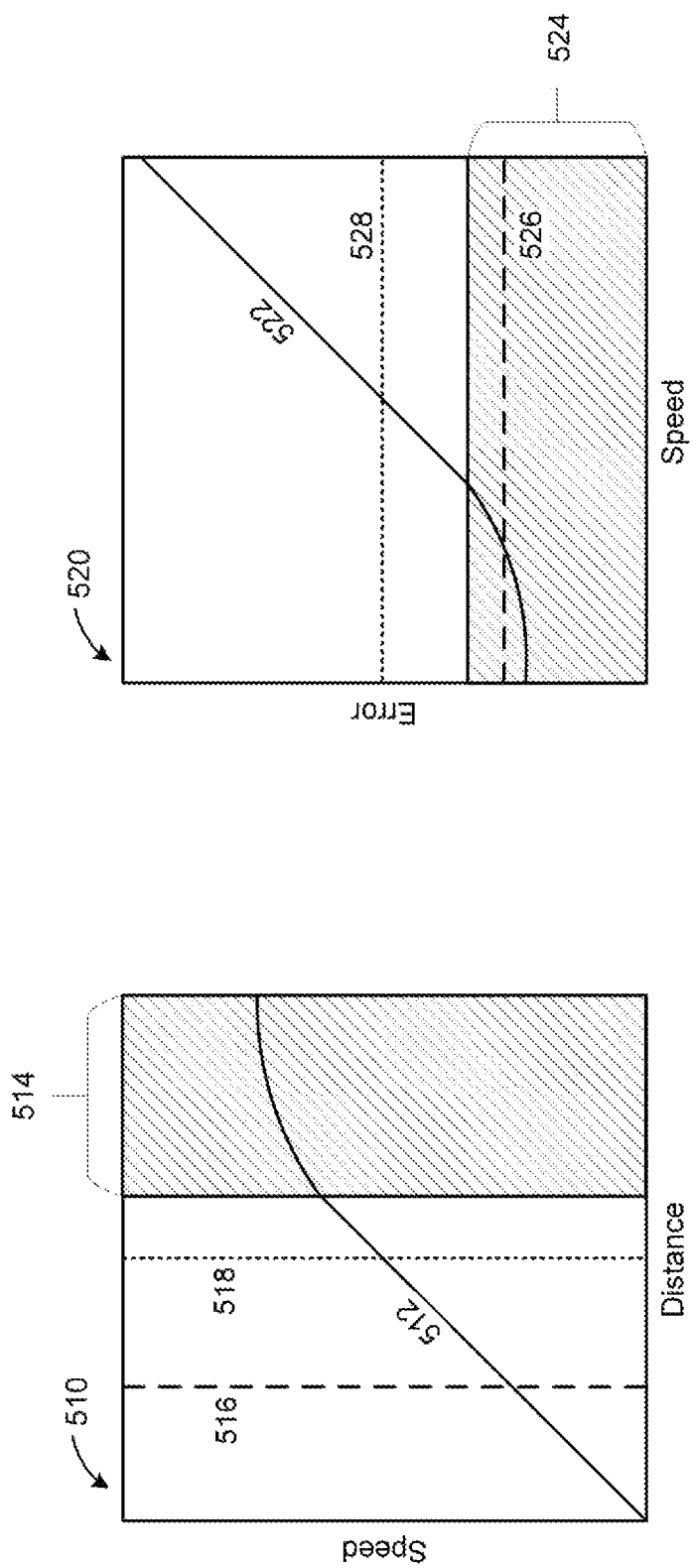
FIG. 5 illustrates an exemplar distance-speed graph and speed-error graph associated with the player of FIG. 4, according to various embodiments.

FIG. 5 illustrates an exemplar distance-speed graph 510 and speed-error graph 520 associated with the player 404 of FIG. 4, according to various embodiments. In distance-speed graph 510, curve 512 represents the distance-speed relationship generated for the player 404. Area 514 identifies a range of distances that should be avoided because the distances within the area 514 correspond to long movement times. Line 516 indicates a distance of target 402 when a high mouse sensitivity is selected. Line 518 indicates a distance of target 402 when a low mouse sensitivity is selected. As shown in FIG. 5, the distance for a high mouse sensitivity corresponds to a lower movement speed while the distance for a low mouse sensitivity corresponds to a higher movement speed.

In speed-error graph 520, curve 522 represents the speed-error relationship generated for the player 404. Area 524 identifies a range of error values that should be avoided because the error values within the area 524 correspond to long movement times. Line 526 indicates an error value corresponding to the mouse movement speed used when a high mouse sensitivity is selected. Line 528 indicates an error value corresponding to the mouse movement speed used when a low mouse sensitivity is selected. As shown in FIG. 5, the amount of error corresponding to the mouse movement speed when a high mouse sensitivity is selected is within the range of error values to be avoided. Accordingly, based on the positions of lines 516, 518, 526, and 528, sensitivity recommendation application 125 could select the low mouse sensitivity for the player 404 to use.

Figure 6:
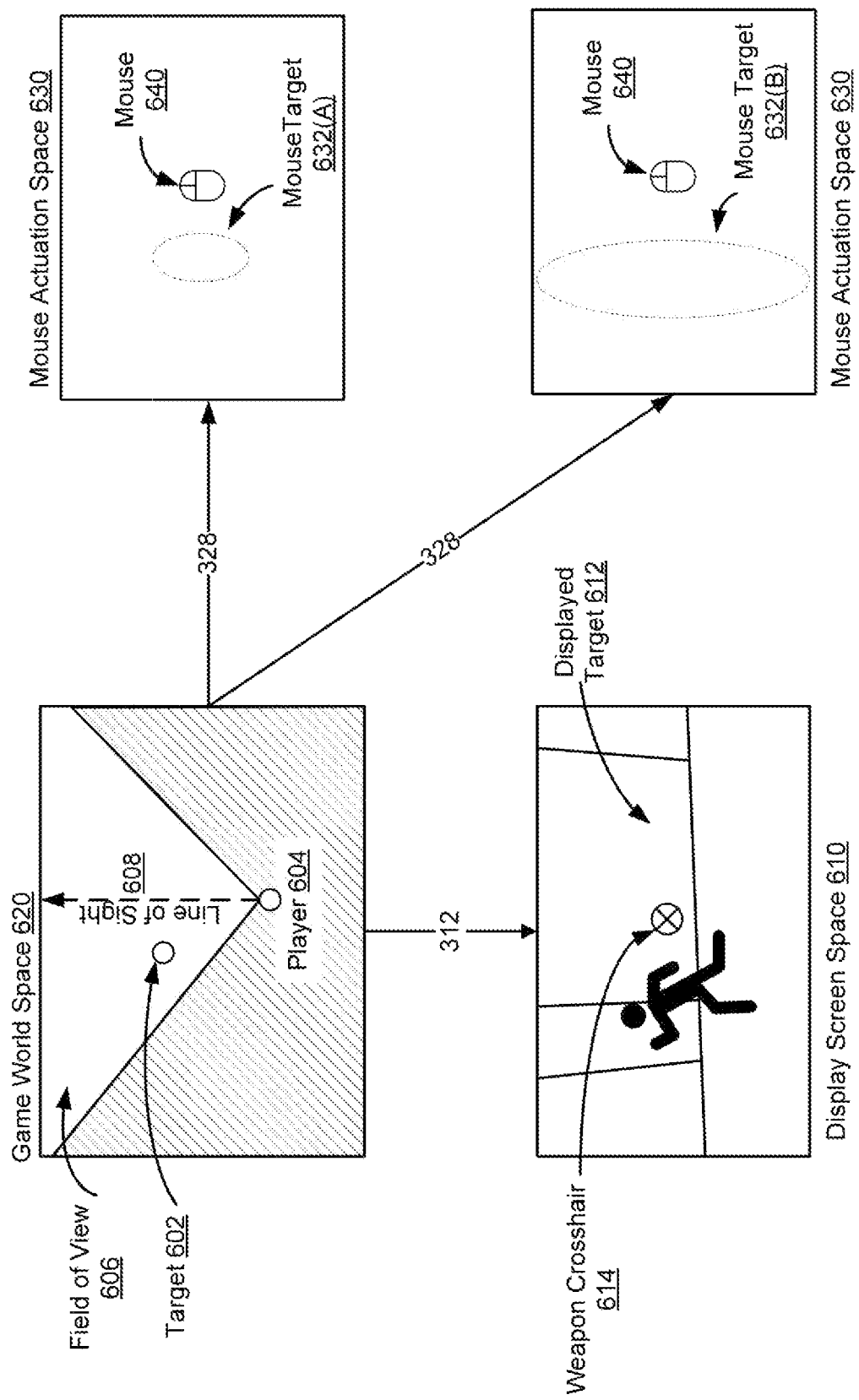
FIG. 6 illustrates additional exemplar target sizes and positions across a game world space, a display screen space, and mouse actuation space, according to other various embodiments.

FIG. 6 illustrates additional exemplar target sizes and positions of a target 602 across a game world space 620, a display screen space 610, and mouse actuation space 630, according to various other embodiments. As shown in FIG. 6, a player 604 and a target 602 are positioned at different locations within the game world space 620. Within game world space 620, player 604 has a line of sight 608 and a field of view 606. The target 602 is located close to player 604 and is slightly to the left of the line of sight 608 of player 604.

The game world space 620 is projected onto display screen space 610 based on the field of view 606 of the player 604. In display screen space 610, a weapon crosshair 614 corresponds to the center of the line of sight 608 of the player 604. Because target 602 is close to the player 604, the displayed target 612 appears large within display screen space 610. Accordingly, the size of mouse targets 632(A) and 632(B) are larger than the size of mouse targets 432(A) and 432(B) illustrated in FIG. 4. As shown in FIG. 6, a high mouse sensitivity results in a mouse target 632 that is smaller but closer to the position of the mouse 640, while a lower mouse sensitivity results in a mouse target 632(B) that is larger but much further away from the position of the mouse 640.

Figure 7:
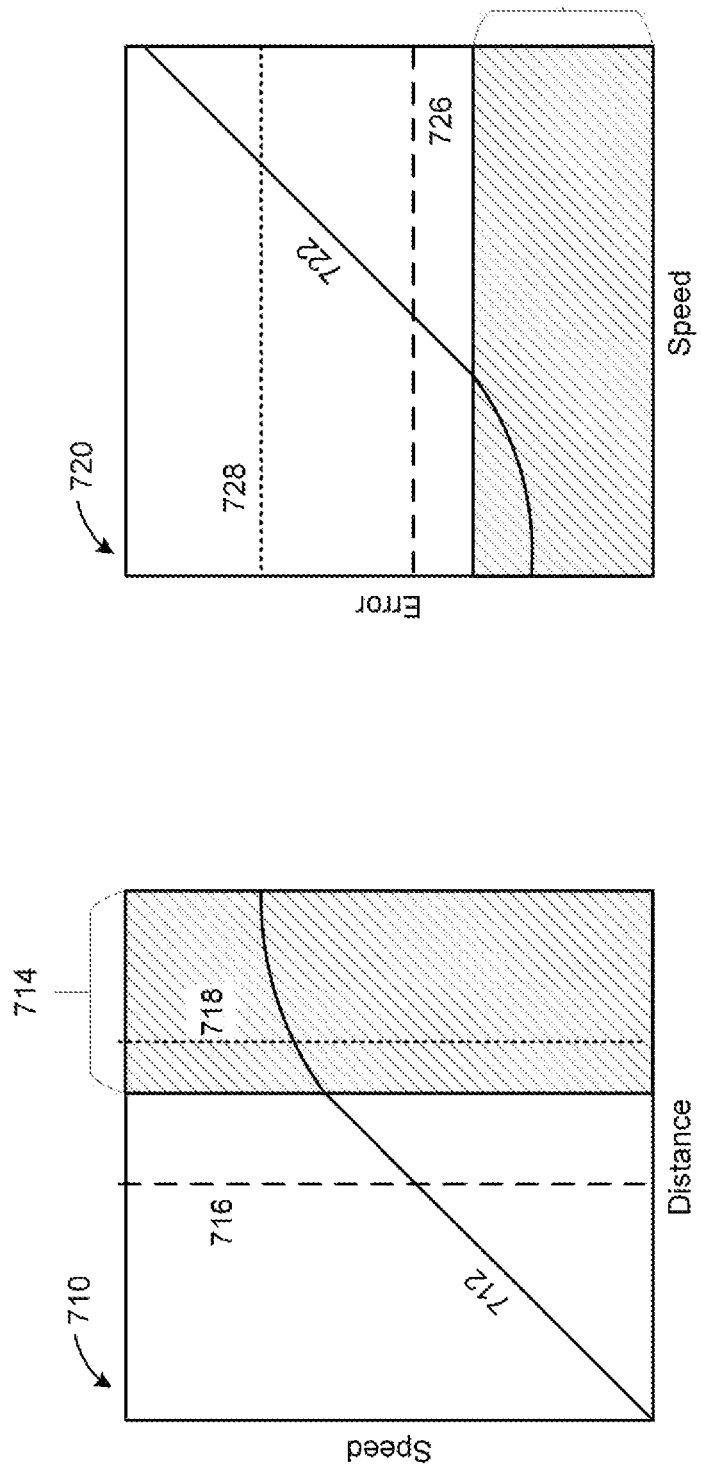
FIG. 7 illustrates an exemplar distance-speed graph and speed-error graph associated with the player of FIG. 6, according to other various embodiments.

FIG. 7 illustrates an exemplar distance-speed graph 710 and speed-error graph 720 associated with the player 604 of FIG. 6, according to various other embodiments. In distance-speed graph 710, curve 712 represents the distance-speed relationship generated for the player 604. Area 714 identifies a range of distances that should be avoided because the distances within the area 714 correspond to long movement times. Line 716 indicates a distance of target 602 when a high mouse sensitivity is selected. Line 718 indicates a distance of target 602 when a low mouse sensitivity is selected. As shown in FIG. 7, the distance for a high mouse sensitivity corresponds to a lower movement speed while the distance for a low mouse sensitivity corresponds to a higher movement speed.

In speed-error graph 720, curve 722 represents the speed-error relationship generated for the player 604. Area 724 identifies a range of error values that should be avoided because the error values within the area 724 correspond to long movement times. Line 726 indicates an error value corresponding to the mouse movement speed used when a high mouse sensitivity is selected. Line 728 indicates an error value corresponding to the mouse movement speed used when a low mouse sensitivity is selected. As shown in FIG. 7, the distance corresponding to the mouse movement speed when a low mouse sensitivity is selected is within the range of distances to be avoided. Accordingly, based on the positions of lines 716, 718, 726, and 728, sensitivity recommendation application 125 could select the high mouse sensitivity for the player 604 to use.

Figure 8:
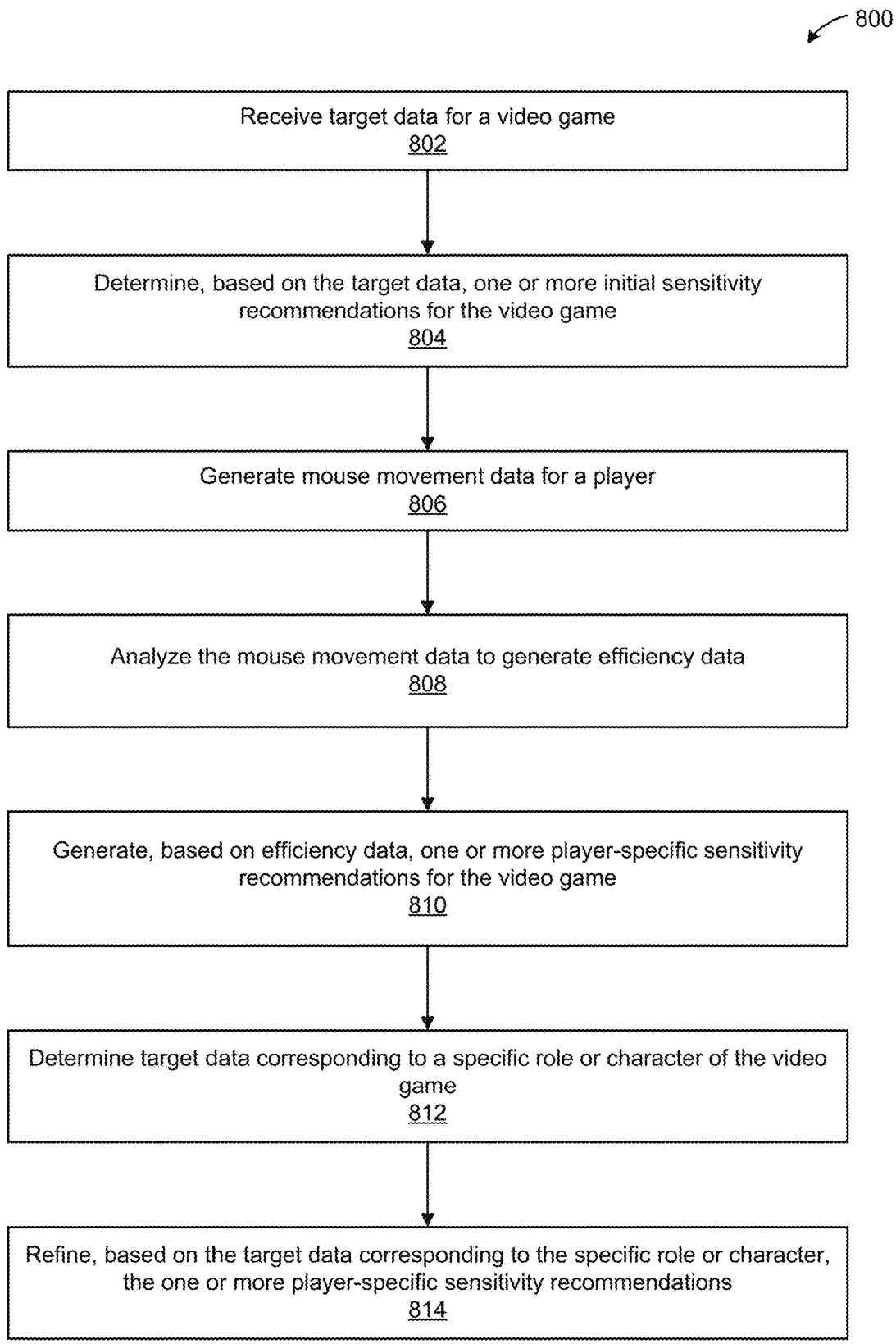
FIG. 8 is a flowchart of method steps for automatically generating one or more mouse sensitivity levels for a user, according to various embodiments.

FIG. 8 is a flowchart of method steps for automatically generating one or more mouse sensitivity levels for a user, according to various embodiments. Although the method steps are described with reference to the systems of FIGS. 1 and 2, persons skilled in the art will understand that any system configured to implement the method steps, in any order, falls within the scope of the present invention.

As shown in FIG. 8, a method 800 begins at step 802, where the sensitivity recommendation application 125 receives target data 202 for a video game 130. The target data 202 includes data indicating one or more target sizes associated with video game 130 and one or more target distances associated with video game 130. Additionally, in some embodiments, sensitivity recommendation application 125 receives other data for the video game 130, such as one or more of weapon data 204, character data 206, role data 208, or portions thereof. In some embodiments, the sensitivity recommendation application 125 receives a subset of target data 202 corresponding to one or more specific weapons, one or more specific characters, and/or one or more specific roles.

At step 804, the sensitivity recommendation application 125 determines, based on the target data 202, one or more initial sensitivity recommendations for the video game 130. In some embodiments, the one or more initial sensitivity recommendations include one or more of a game-specific sensitivity recommendation, a character-specific sensitivity recommendation, or a role-specific sensitivity recommendation. Generating the one or more initial sensitivity recommendations is performed in a manner similar to that discussed above with respect to sensitivity recommendation application 125 and sensitivity recommendations 236.

In some embodiments, sensitivity recommendation application 125 generates one or more game-specific sensitivity recommendations based on one or more stored or predefined mappings that correlate sizes of targets and/or distances of targets with different sensitivity values. Sensitivity recommendation application 125 determines, based on the mappings, one or more sensitivity values that correspond to the sizes and distances associated with the plurality of targets.

In some embodiments, sensitivity recommendation application 125 generates one or more game-specific sensitivity recommendations based on generalized or model efficiency data. The generalized or model efficiency data includes generalized speed-error relationship data and generalized distance-speed relationship data. Sensitivity recommendation application 125 determines, based on the generalized distance-speed relationship data and the generalized speed-error relationship data, predicted task completion times and error values when using different mouse sensitivity levels. Sensitivity recommendation application 125 selects one or more mouse sensitivity levels based on the predicted task completion times and error values.

At step 806, the sensitivity recommendation application 125 generates mouse movement data 232 for a player. The mouse movement data 232 includes data indicating mouse positions corresponding to different timestamp values. In some embodiments, sensitivity recommendation application 125 tracks and/or records mouse movements made by the player and generates the mouse movement data 232. In some embodiments, sensitivity recommendation application 125 tracks or captures mouse movements and generates the mouse movement data 232 based on the tracked or captured mouse movements. In some embodiments, sensitivity recommendation application 125 receives mouse movement information from video game 130 or from a separate application that captures mouse movements and generates the mouse movement data 232 based on the mouse movement information.

In some embodiments, generating the mouse movement data 232 includes segmenting the mouse movement data 232 into a plurality of mouse sub-movements and generating data associated with the plurality of mouse sub-movements. The data associated with the plurality of mouse sub-movements includes one or more of sub-movement start times, sub-movement end times, sub-movement starting target distance, sub-movement velocity, and sub-movement error values. Segmenting the mouse movement data 232 into a plurality of mouse sub-movements and generating data associated with the plurality of mouse sub-movements is performed in a manner similar to that discussed above with respect to sensitivity recommendation application 125, accuracy data 230, and mouse movement data 232.

In some embodiments, sensitivity recommendation application 125 determines a start time of a sub-movement by comparing the velocity at a given timestamp with a start velocity threshold. If sensitivity recommendation application 125 has not identified a new sub-movement, then sensitivity recommendation application 125 compares the velocity at the current timestamp with the start velocity threshold. If the velocity at the current timestamp is higher than the start velocity threshold, then sensitivity recommendation application 125 identifies the current timestamp as the start time of a sub-movement.

In some embodiments, sensitivity recommendation application 125 determines an end time of a sub-movement by comparing the velocity at subsequent timestamps with an end velocity threshold. If sensitivity recommendation application 125 determined a start time corresponding to a current sub-movement and has not identified an end time corresponding to the current sub-movement, then sensitivity recommendation application 125 compares the velocity at the current timestamp with the end velocity threshold. If the velocity at the current timestamp is below the end velocity threshold, then sensitivity recommendation application 125 identifies the current timestamp as the end time of the current sub-movement. In some embodiments, when determining an end time of a sub-movement, sensitivity recommendation application 125 compares the time interval between the current timestamp and the start time of the sub-movement with a duration threshold. The duration threshold indicates a minimum duration of a sub-movement. If the velocity at the current timestamp is less than the end velocity threshold but the time interval is less than the duration threshold, then the current timestamp is not identified as the end time of the sub-movement.

At step 808, the sensitivity recommendation application 125 analyzes the mouse movement data 232 to generate efficiency data 234. Generating the efficiency data 234 is performed in a manner similar to that discussed above with respect to sensitivity recommendation application 125 and efficiency data 234. In some embodiments, the efficiency data 234 includes distance-speed relationship data and speed-error relationship data.

In some embodiments, sensitivity recommendation application 125 determines, at the beginning of each mouse sub-movement of a plurality of mouse sub-movements, a distance to the target from the view direction. Sensitivity recommendation application 125 converts the distance to the target from a distance in game world space 320 to a distance in mouse actuation space 330. At the end of the mouse sub-movement, sensitivity recommendation application 125 calculates a speed of the mouse sub-movement based on the distance that the mouse travelled during the mouse sub-movement and the duration of the mouse sub-movement.

In some embodiments, sensitivity recommendation application 125 fits curves to the distance-speed relationship and the speed-error relationship to the mouse movement data 232 and accuracy data 230. In some embodiments, fitting curves to the distance-speed relationship includes generating a plurality of distance-speed data points corresponding to a plurality of mouse movements or mouse sub-movements, where each distance-speed data point indicates the distance to the target at the beginning of the mouse movement or sub-movement compared to the average speed associated with the mouse movement or sub-movement. One or more curves or functions are generated based on the plurality of distance-speed data points. In some embodiments, fitting curves to the speed-error relationship includes generating a plurality of speed-error data points corresponding to the plurality of mouse movements or mouse sub-movements, where each speed-error data points indicates the average speed associated with the mouse movement or sub-movement compared to the amount of error associated with the mouse movement or sub-movement. One or more curves or functions are generated based on the plurality of speed-error data points.

At step 810, the sensitivity recommendation application 125 generates, based on the efficiency data 234, one or more player-specific sensitivity recommendations for the video game 130. The one or more player-specific sensitivity recommendations could include one or more mouse sensitivity levels and/or one or more ranges of mouse sensitivity levels. Generating the one or more player-specific sensitivity recommendations is performed in a manner similar to that discussed above with respect to sensitivity recommendation application 125 and sensitivity recommendations 236.

In some embodiments, sensitivity recommendation application 125 determines, based on the distance-speed data and the speed-error data, predicted task completion times and error values for the player when using different mouse sensitivity levels. Additionally, determining the predicted task completion times could be based on the sizes and distances of targets in video game 130. Sensitivity recommendation application 125 determines one or more mouse sensitivity levels based on the predicted task completion times and error values. In some embodiments, sensitivity recommendation application 125 determines one or more mouse sensitivities associated with the highest task completion time(s) and/or lowest error(s).

At step 812, sensitivity recommendation application 125 determines target data 202 corresponding to a specific role or character of the video game 130. In some embodiments, determining target data 202 corresponding to a specific role or character includes identifying a subset of target data 202 that corresponds to the specific role or character. The subset of target data 202 includes target sizes and/or target distances for targets associated with the specific role or character. In some embodiments, sensitivity recommendation application 125 determines, based on target data 202 and character data 206, sizes and distances of targets associated with a given character. In some embodiments, sensitivity recommendation application 125 determines, based on target data 202 and role data 208, sizes and distances of targets associated with a given role.

At step 814, sensitivity recommendation application 125 refines the one or more player-specific sensitivity recommendations based on the target data 202 corresponding to the specific role or character. In some embodiments, the one or more player-specific sensitivity recommendations are generated based on a first set of target data and a second set of target data corresponding to the specific role or character is a subset of the first set of target data. Sensitivity recommendation application 125 filters the one or more player-specific sensitivity recommendations based on the second set of target data to exclude player specific sensitivity recommendations that correspond to target data that is not included in the second set of target data. In some embodiments, sensitivity recommendation application 125 determines one or more new player-specific sensitivity recommendations based on the second set of target data.

In some embodiments, rather than refining one or more player-specific sensitivity recommendations based on a specific character or role, at step 810, sensitivity recommendation application 125 generates one or more player-specific sensitivity recommendations, where each player-specific sensitivity recommendation corresponds to a different role or character.

Figure 9:
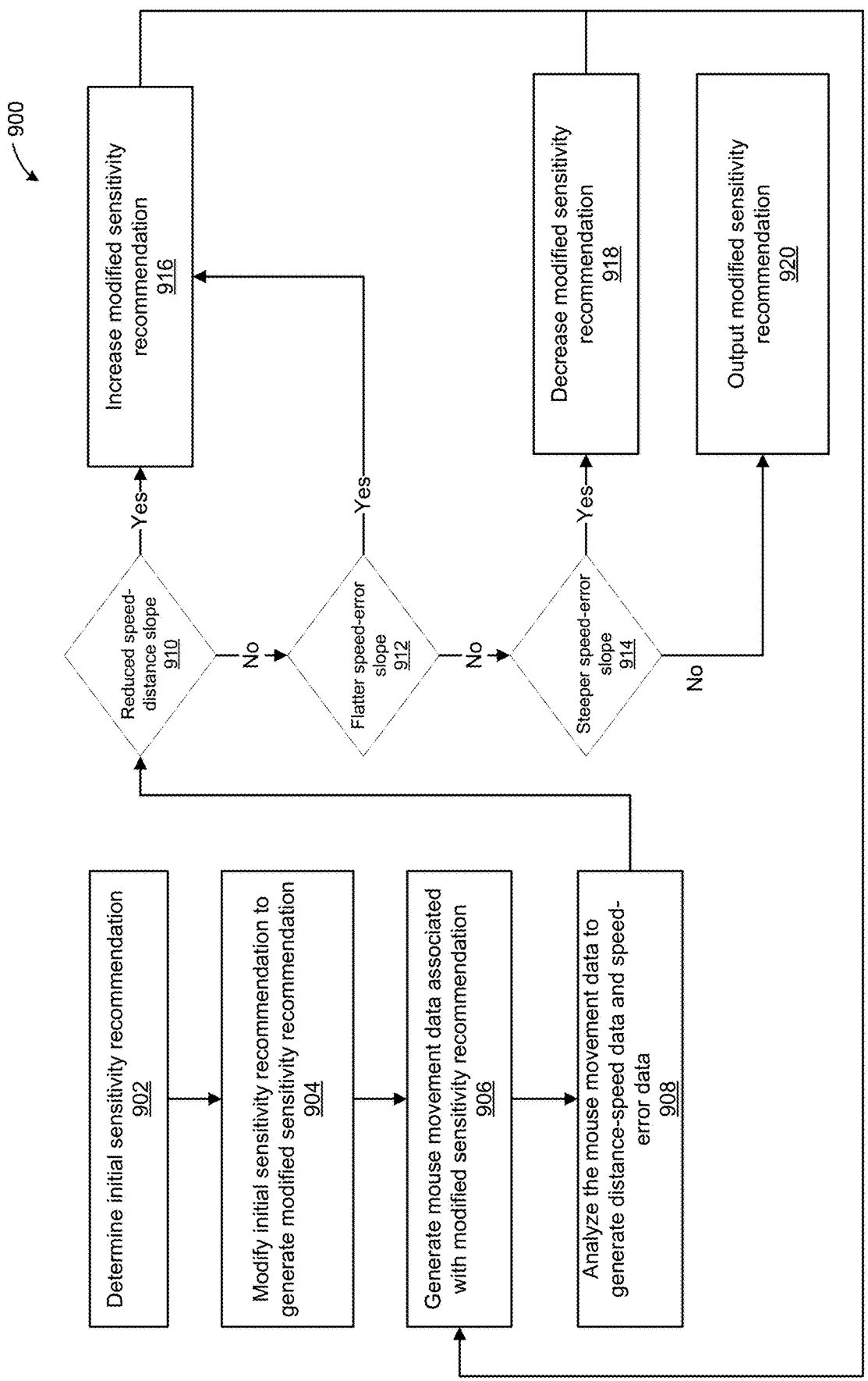
FIG. 9 is a flowchart of method steps for automatically refining a selected mouse sensitivity level, according to various embodiments.

FIG. 9 is a flowchart of method steps for automatically refining a selected mouse sensitivity level, according to various embodiments. Although the method steps are described with reference to the systems of FIGS. 1 and 2, persons skilled in the art will understand that any system configured to implement the method steps, in any order, falls within the scope of the present invention.

As shown in FIG. 9, a method 900 begins at step 902, where sensitivity recommendation application 125 determines an initial sensitivity recommendation 236. In some embodiments, the initial sensitivity recommendation 236 is one of a game-specific sensitivity recommendation, a role-specific sensitivity recommendation, a character-specific sensitivity recommendation, a player-specific sensitivity recommendation, role-specific player-specific sensitivity recommendation, or a character-specific player-specific sensitivity recommendation. The initial sensitivity recommendation 236 is generated in a manner similar to that described above with respect to sensitivity recommendation application 125 and the steps of method 800.

At step 904, the sensitivity recommendation application 125 modifies the initial sensitivity recommendation 236 to generate a modified sensitivity recommendation. In some embodiments, modifying the initial sensitivity recommendation 236 includes increasing or decreasing the initial sensitivity level by a random amount. In some embodiments, modifying the initial sensitivity recommendation 236 includes receiving or generating mouse movement data associated with mouse movements performed by the user while using the mouse sensitivity level identified by the initial sensitivity recommendation 236. Sensitivity recommendation application 125 could perform steps similar to 906-918 described below in order to determine how to modify the initial sensitivity recommendation 236.

At step 906, the sensitivity recommendation application 125 generates mouse movement data 232 corresponding to mouse movements performed by the user while using the modified sensitivity level. Additionally, sensitivity recommendation application 125 generates accuracy data 230 associated with the mouse movements performed by the user. In some embodiments, the mouse movements are associated with a targeting task, such as using a specific weapon, role, character, or combination thereof.

At step 908, the sensitivity recommendation application 125 analyzes the mouse movement data 232 and accuracy data 230 to generate distance-speed relationship data and speed-error relationship data associated with the mouse movements performed by the user while using the modified sensitivity level. Generating distance-speed relationship data and speed-error relationship data is performed in a manner similar to that described above with respect to sensitivity recommendation application 125 and efficiency data 234.

At step 910, the sensitivity recommendation application 125 determines whether the slope associated with the distance-speed relationship is reduced compared to the slope associated with a previous distance-speed relationship. The sensitivity recommendation application 125 compares the slope of the distance-speed relationship associated with the modified sensitivity level with the slope of the distance-speed relationship associated with a previous sensitivity recommendation. If the current iteration is the first iteration, then the sensitivity recommendation application 125 compares the slope of the distance-speed relationship associated with the modified sensitivity level with the slope of the distance-speed relationship associated with the initial sensitivity recommendation. In some embodiments, if a distance-speed relationship associated with the initial sensitivity recommendation is unavailable, sensitivity recommendation application 125 could compare the slope of the distance-speed relationship associated with the modified sensitivity level with the slope of a general-purpose or model distance-speed relationship. If the slope of the distance-speed relationship was reduced, then the method proceeds to step 916, where the sensitivity recommendation application 125 increases the modified sensitivity recommendation. The method 900 returns to step 906, where the sensitivity recommendation application 125 generates mouse movement data 232 corresponding to mouse movements performed by the user while using the increased sensitivity level.

If the slope of the distance-speed relationship was not reduced, then the method proceeds to step 912, where the sensitivity recommendation application 125 determines whether the slope associated with the speed-error relationship is flatter compared to the slope associated with a previous speed-error relationship. The sensitivity recommendation application 125 compares the slope of the speed-error relationship associated with the modified sensitivity level with the slope of the speed-error relationship associated with a previous sensitivity recommendation. If the current iteration is the first iteration, then the sensitivity recommendation application 125 compares the slope of the speed-error relationship associated with the modified sensitivity level with the slope of the speed-error relationship associated with the initial sensitivity recommendation. In some embodiments, if a speed-error relationship associated with the initial sensitivity recommendation is unavailable, sensitivity recommendation application 125 could compare the slope of the speed-error relationship associated with the modified sensitivity level with the slope of a general-purpose or model speed-error relationship. If the slope of the speed-error relationship is flatter, then the method proceeds to step 916.

If the slope of the speed-error relationship was not flatter, then the method proceeds to step 914, where the sensitivity recommendation application 125 determines whether the slope associated with the speed-error relationship is steeper compared to the slope associated with a previous speed-error relationship. If the slope of the speed-error relationship is steeper, then the method proceeds to step 918, where the sensitivity recommendation application 125 decreases the modified sensitivity recommendation. The method 900 then returns to step 906, where the sensitivity recommendation application 125 generates mouse movement data 232 corresponding to mouse movements performed by the user while using the decreased sensitivity level.

If the slope of the speed-error relationship was not steeper, then the method proceeds to step 920, where the sensitivity recommendation application 125 determines the current mouse sensitivity level as the recommended mouse sensitivity level for the targeting task. The sensitivity recommendation 125 outputs the mouse sensitivity recommended in connection with the targeting task. Optionally, the steps 906-920 could be repeated to identify recommended mouse sensitivity levels for different targeting tasks.

In sum, the disclosed techniques enable automatic generation of one or more recommended mouse sensitivity levels for a user. A sensitivity recommendation application determines target data that describes sizes and distances of different targets in a video game. Additionally, the sensitivity recommendation application generates mouse movement data based on mouse movements made by a player and analyzes the mouse movement data to generate efficiency data associated with the mouse movements made by the player. The sensitivity recommendation application uses the efficiency data to predict a mouse movement efficiency of the player for a given combination of mouse sensitivity level, target size, and target distance. Based on predicted mouse movement efficiencies for a set of targets of a video game, the sensitivity recommendation application determines one or more recommended mouse sensitivities or one or more ranges of recommended mouse sensitivities for the player.

At least one technical advantage of the disclosed techniques relative to the prior art is that, with the disclosed techniques, characteristics of an individual player are used to generate mouse sensitivity recommendations for that individual player. In particular, by analyzing the virtual motions produced by mouse movements made by an individual player, a pointing efficiency for that individual player can be predicted. The pointing efficiency is then used to generate the mouse sensitivity recommendations for that individual player. Accordingly, the disclosed techniques produce recommended mouse sensitivities that are specific to the types of mouse movements made by the individual player, thereby providing the player with a suitable mouse sensitivity while avoiding the inefficient trial-and-error process oftentimes experienced with prior art approaches. Further, the disclosed techniques do not rely on mouse sensitivities used by other players when generating the mouse sensitivity recommendations for an individual player. Therefore, the disclosed techniques can be used to generate a mouse sensitivity recommendation for an individual player of a video game where mouse sensitivities used by other players and information about commonly-used mouse sensitivities are unavailable. These technical advantages provide one or more technological advancements over prior art approaches.

1. In some embodiments, a computer-implemented method for automatically generating mouse sensitivity recommendations comprises generating mouse movement data corresponding to one or more mouse movements performed by a user while interacting with a software application; generating a predicted efficiency for each mouse sensitivity level included in a plurality of mouse sensitivity levels based on the mouse movement data; and determining one or more mouse sensitivity levels to provide to the user based on the predicted efficiencies.

2. The method of clause 1, wherein generating the mouse movement data comprises segmenting the one or more mouse movements into a plurality of mouse sub-movements.

3. The method of clauses 1 or 2, wherein segmenting the one or more mouse movements into the plurality of mouse sub-movements comprises calculating, for each timestamp of a plurality of timestamps included in the mouse movement data, a different mouse movement velocity corresponding to the timestamp; and segmenting the one or more mouse movements based on the plurality of mouse movement velocities.

4. The method of any of clauses 1-3, wherein segmenting the one or more mouse movements is further based on a minimum duration associated with the plurality of mouse sub-movements.

5. The method of any of clauses 1-4, further comprising generating accuracy data corresponding to the one or more mouse movements, wherein generating the plurality of predicted efficiencies is further based on the accuracy data.

6. The method of any of clauses 1-5, wherein generating the plurality of predicted efficiencies comprises generating a first function that indicates a correspondence between a plurality of target distances and a plurality of mouse movement and a second function that indicates a correspondence between a plurality of mouse movement speeds and a plurality of error values based on the mouse movement data and the accuracy data; and for each mouse sensitivity level included in a plurality of mouse sensitivity levels, predicting a mouse movement time associated with selecting a target using the mouse sensitivity level based on at least one of the first function or the second function.

7. The method of any of clauses 1-6, wherein generating the predicted efficiency for each mouse sensitivity level included in the plurality of mouse sensitivity levels is further based on at least one of a plurality of target sizes associated with the software application or a plurality of target distances associated with the software application.

8. The method of any of clauses 1-7, further comprising causing a first mouse sensitivity level that is included in the one or more mouse sensitivity levels and has been selected by the user to be applied to the software application.

9. The method of any of clauses 1-8, wherein the software application is a video game.

10. The method of any of clauses 1-9, further comprising generating second mouse movement data corresponding to one or more second mouse movements performed by the user while interacting with the software application using the first mouse sensitivity level; generating a second predicted efficiency for each mouse sensitivity level included in the plurality of mouse sensitivity levels based on the second mouse movement data; and determining one or more second mouse sensitivity levels to provide to the user based on the second predicted efficiencies.

11. In some embodiments, one or more non-transitory computer-readable media include instructions that, when executed by one or more processors, cause the one or more processors to perform the steps of generating mouse movement data corresponding to one or more mouse movements performed by a user while interacting with a software application; generating a predicted efficiency for each mouse sensitivity level included in a plurality of mouse sensitivity levels based on the mouse movement data; and determining one or more mouse sensitivity levels to provide to the user based on the predicted efficiencies.

12. The one or more non-transitory computer-readable media of clause 11, wherein generating the mouse movement data comprises segmenting the one or more mouse movements into a plurality of mouse sub-movements.

13. The one or more non-transitory computer-readable media of clauses 11 or 12, wherein segmenting the one or more mouse movements into the plurality of mouse sub-movements comprises calculating, for each timestamp of a plurality of timestamps included in the mouse movement data, a different mouse movement velocity corresponding to the timestamp; and segmenting the one or more mouse movements based on the plurality of mouse movement velocities.

14. The one or more non-transitory computer readable media of any of clauses 11-13, wherein segmenting the one or more movements based on the plurality of mouse movement velocities comprises selecting a subset of timestamps included in the plurality of timestamps as a set of mouse sub-movement starting timestamps, wherein each timestamp included in the subset of timestamps corresponds to a mouse movement velocity that is higher than a threshold velocity.

15. The one or more non-transitory computer readable media of any of clauses 11-14, wherein segmenting the one or more movements based on the plurality of mouse movement velocities comprises selecting a subset of timestamps included in the plurality of timestamps as a set of mouse sub-movement ending timestamps, wherein each timestamp included in the subset of timestamps corresponds to a mouse movement velocity that is lower than a threshold velocity.

16. The one or more non-transitory computer-readable media of any of clauses 11-15, further comprising generating accuracy data corresponding to the one or more mouse movements, wherein generating the plurality of predicted efficiencies is further based on the accuracy data.

17. The one or more non-transitory computer-readable media of any of clauses 11-16, wherein generating the plurality of predicted efficiencies comprises generating a first function that indicates a correspondence between a plurality of target distances and a plurality of mouse movement and a second function that indicates a correspondence between a plurality of mouse movement speeds and a plurality of error values based on the mouse movement data and the accuracy data; and for each mouse sensitivity level included in a plurality of mouse sensitivity levels, predicting a mouse movement time associated with selecting a target using the mouse sensitivity level based on at least one of the first function or the second function.

18. The one or more non-transitory computer-readable media of any of clauses 11-17, further comprising determining a plurality of target sizes associated with the software application and a plurality of target distances associated with the software application, and wherein generating the predicted efficiency for each mouse sensitivity level included in the plurality of mouse sensitivity levels is further based on the plurality of target sizes and the plurality of target distances.

19. The one or more non-transitory computer-readable media of any of clauses 11-18, wherein the software application is a video game, wherein the one or more mouse movements are associated with at least one of a role selected by the user while playing the video game or a character selected by the user while playing the video game, and wherein the plurality of target sizes and the plurality of target distances are associated with the at least one of the role selected by the user or the character selected by the user.

20. In some embodiments, a system comprises one or more memories storing instructions and one or more processors that are coupled to the one or more memories and, when executing the instructions, perform the steps of generating mouse movement data corresponding to one or more mouse movements performed by a user while playing a video game; generating a predicted efficiency for each mouse sensitivity level included in a plurality of mouse sensitivity levels based on the mouse movement data; and selecting one or more mouse sensitivity levels for the user based on the predicted efficiencies.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically generating mouse sensitivity recommendations, the method comprising:
    generating mouse movement data corresponding to one or more mouse movements performed by a user while interacting with a software application;
    generating a predicted efficiency for each mouse sensitivity level included in a plurality of mouse sensitivity levels based on the mouse movement data;
    determining a size of at least one target associated with the software application; and
    determining one or more mouse sensitivity levels to provide to the user based on the predicted efficiencies and the size of the at least one target.

2. The method of claim 1, wherein generating the mouse movement data comprises segmenting the one or more mouse movements into a plurality of mouse sub-movements.

3. The method of claim 2, wherein segmenting the one or more mouse movements into the plurality of mouse sub-movements comprises:
    calculating, for each timestamp of a plurality of timestamps included in the mouse movement data, a different mouse movement velocity corresponding to the timestamp; and
    segmenting the one or more mouse movements based on the plurality of mouse movement velocities.

4. The method of claim 3, wherein segmenting the one or more mouse movements is further based on a minimum duration associated with the plurality of mouse sub-movements.

5. The method of claim 1, further comprising generating accuracy data corresponding to the one or more mouse movements, wherein generating the plurality of predicted efficiencies is further based on the accuracy data.

6. The method of claim 5, wherein generating the plurality of predicted efficiencies comprises:
    generating a first function that indicates a correspondence between a plurality of target distances and a plurality of mouse movement and a second function that indicates a correspondence between a plurality of mouse movement speeds and a plurality of error values based on the mouse movement data and the accuracy data; and for each mouse sensitivity level included in a plurality of mouse sensitivity levels, predicting a mouse movement time associated with selecting a target using the mouse sensitivity level based on at least one of the first function or the second function.

7. The method of claim 1, wherein generating the predicted efficiency for each mouse sensitivity level included in the plurality of mouse sensitivity levels is further based on a plurality of target distances associated with the software application.

8. The method of claim 1, further comprising causing a first mouse sensitivity level that is included in the one or more mouse sensitivity levels and has been selected by the user to be applied to the software application.

9. The method of claim 1, wherein the software application is a video game.

10. The method of claim 9, further comprising:
generating second mouse movement data corresponding to one or more second mouse movements performed by the user while interacting with the software application using a first mouse sensitivity level;
generating a second predicted efficiency for each mouse sensitivity level included in the plurality of mouse sensitivity levels based on the second mouse movement data; and
determining one or more second mouse sensitivity levels to provide to the user based on the second predicted efficiencies.

11. One or more non-transitory computer-readable media including instructions that, when executed by one or more processors, cause the one or more processors to perform the steps of:
generating mouse movement data corresponding to one or more mouse movements performed by a user while interacting with a software application;
generating a predicted efficiency for each mouse sensitivity level included in a plurality of mouse sensitivity levels based on the mouse movement data;
determining a size of at least one target associated with the software application; and
determining one or more mouse sensitivity levels to provide to the user based on the predicted efficiencies and the size of the at least one target.

12. The one or more non-transitory computer-readable media of claim 11, wherein generating the mouse movement data comprises segmenting the one or more mouse movements into a plurality of mouse sub-movements.

13. The one or more non-transitory computer-readable media of claim 12, wherein segmenting the one or more mouse movements into the plurality of mouse sub-movements comprises:
calculating, for each timestamp of a plurality of timestamps included in the mouse movement data, a different mouse movement velocity corresponding to the timestamp; and
segmenting the one or more mouse movements based on the plurality of mouse movement velocities.

14. The one or more non-transitory computer readable media of claim 13, wherein segmenting the one or more movements based on the plurality of mouse movement velocities comprises selecting a subset of timestamps included in the plurality of timestamps as a set of mouse sub-movement starting timestamps, wherein each timestamp included in the subset of timestamps corresponds to a mouse movement velocity that is higher than a threshold velocity.

15. The one or more non-transitory computer readable media of claim 13, wherein segmenting the one or more movements based on the plurality of mouse movement velocities comprises selecting a subset of timestamps included in the plurality of timestamps as a set of mouse sub-movement ending timestamps, wherein each timestamp included in the subset of timestamps corresponds to a mouse movement velocity that is lower than a threshold velocity.

16. The one or more non-transitory computer-readable media of claim 11, further comprising generating accuracy data corresponding to the one or more mouse movements, wherein generating the plurality of predicted efficiencies is further based on the accuracy data.

17. The one or more non-transitory computer-readable media of claim 16, wherein generating the plurality of predicted efficiencies comprises:
generating a first function that indicates a correspondence between a plurality of target distances and a plurality of mouse movement and a second function that indicates a correspondence between a plurality of mouse movement speeds and a plurality of error values based on the mouse movement data and the accuracy data; and
for each mouse sensitivity level included in a plurality of mouse sensitivity levels, predicting a mouse movement time associated with selecting a target using the mouse sensitivity level based on at least one of the first function or the second function.

18. The one or more non-transitory computer-readable media of claim 11, further comprising determining a plurality of target distances associated with the software application, and wherein generating the predicted efficiency for each mouse sensitivity level included in the plurality of mouse sensitivity levels is further based on the plurality of target distances.

19. The one or more non-transitory computer-readable media of claim 18, wherein the software application is a video game, wherein the one or more mouse movements are associated with at least one of a role selected by the user while playing the video game or a character selected by the user while playing the video game, and wherein the size of the at least one target and the plurality of target distances are associated with the at least one of the role selected by the user or the character selected by the user.

20. A system comprising:
one or more memories storing instructions; and
one or more processors that are coupled to the one or more memories and, when executing the instructions, perform the steps of:
generating mouse movement data corresponding to one or more mouse movements performed by a user while playing a video game;
generating a predicted efficiency for each mouse sensitivity level included in a plurality of mouse sensitivity levels based on the mouse movement data;
determining a size of at least one target associated with the software application; and
selecting one or more mouse sensitivity levels for the user based on the predicted efficiencies and the size of the at least one target.

* * * * *